(12) United States Patent
Collings et al.

(10) Patent No.: US 11,454,929 B2
(45) Date of Patent: Sep. 27, 2022

(54) METHOD OF HOLOGRAM CALCULATION

(71) Applicant: Dualitas Ltd, Milton Keynes (GB)

(72) Inventors: Neil Collings, Milton Keynes (GB); Jamieson Christmas, Milton Keynes (GB)

(73) Assignee: DUALITAS LTD, Milton Keynes (GB)

(*) Notice: Subject to any disclaimer, the term of this patent is extended or adjusted under 35 U.S.C. 154(b) by 0 days.

(21) Appl. No.: 15/734,427

(22) PCT Filed: Aug. 22, 2019

(86) PCT No.: PCT/EP2019/072509
§ 371 (c)(1),
(2) Date: Dec. 2, 2020

(87) PCT Pub. No.: WO2020/039038
PCT Pub. Date: Feb. 27, 2020

(65) Prior Publication Data
US 2021/0173341 A1    Jun. 10, 2021

(30) Foreign Application Priority Data

Aug. 23, 2018  (GB) ..................................... 1813767
Aug. 23, 2018  (GB) ..................................... 1813773

(51) Int. Cl.
*G03H 1/08*   (2006.01)
*G03H 1/02*   (2006.01)
(Continued)

(52) U.S. Cl.
CPC ............ *G03H 1/0841* (2013.01); *G03H 1/02* (2013.01); *G03H 1/0808* (2013.01); *G03H 1/16* (2013.01);
(Continued)

(58) Field of Classification Search
CPC ...... G03H 1/0841; G03H 1/02; G03H 1/0808; G03H 1/16; G03H 2001/0224;
(Continued)

(56) References Cited

U.S. PATENT DOCUMENTS 5,416,618 A * 5/1995 Juday .................. G02F 3/00
349/1
5,859,728 A * 1/1999 Colin ................. G06V 10/88
359/256
(Continued)

FOREIGN PATENT DOCUMENTS

GB    2 438 026    11/2007
GB    2 444 990    6/2008
(Continued)

OTHER PUBLICATIONS

Robert W. Cohn, "Pseudorandom encoding of complex-valued functions onto amplitude-coupled phase modulators", J. Opt. Soc. Am. A/vol. 15, No. 4, Apr. 1998, pp. 868-883.
(Continued)

*Primary Examiner* — Rodney Amadiz
(74) *Attorney, Agent, or Firm* — McDonnell Boehnen Hulbert & Berghoff LLP

(57) ABSTRACT

A method of calculating a hologram having an amplitude and a phase component. The method comprises (i) receiving an input image comprising a plurality of data values representing amplitude. The method then comprises (ii) assigning a random phase value to each data value of the plurality of data values to form a complex data set. The method then comprises (iii) performing an inverse Fourier transform of the complex data set. The method then comprises (iv) constraining each complex data value (X1, X2) of the transformed complex data set to one of a plurality of allowable complex data values (GL1-GL8), each comprising an amplitude modulation value and a phase modulation
(Continued)

value, to form a hologram, wherein, the phase modulation values (GL1-GL7) of the plurality of allowable complex data values substantially span at least $3\pi/2$ and at least one of the allowable complex data values has an amplitude modulation value of substantially zero (GL8) and a phase modulation value of substantially zero.

19 Claims, 15 Drawing Sheets

(51) Int. Cl.
*G03H 1/16* (2006.01)
*G09G 3/20* (2006.01)
*G09G 3/36* (2006.01)

(52) U.S. Cl.
CPC ............ *G09G 3/2085* (2013.01); *G09G 3/36* (2013.01); *G03H 2001/0224* (2013.01); *G03H 2001/0816* (2013.01); *G03H 2225/22* (2013.01); *G03H 2225/34* (2013.01); *G09G 2300/0478* (2013.01)

(58) Field of Classification Search
CPC ....... G03H 2001/0816; G03H 2225/22; G03H 2225/34; G03H 2225/31; G03H 2225/32; G03H 2225/33; G03H 2225/60; G03H 2240/42; G03H 1/2294; G09G 3/2085; G09G 3/36; G09G 2300/0478
See application file for complete search history.

(56) References Cited

U.S. PATENT DOCUMENTS

| | | | |
|---|---|---|---|
| 6,248,487 B1 | 6/2001 | Cohn et al. | |
| 2009/0128875 A1 | 5/2009 | Christmas et al. | |
| 2009/0303571 A1* | 12/2009 | Sandstrom ........... | G02B 5/1809 |
| | | | 359/291 |
| 2010/0195178 A1 | 8/2010 | Leister et al. | |
| 2014/0049451 A1 | 2/2014 | Sugiyama et al. | |

FOREIGN PATENT DOCUMENTS

| | | |
|---|---|---|
| GB | 2509180 A | 6/2014 |
| JP | 2004-184609 A | 7/2004 |
| JP | 2009-536748 A | 10/2009 |
| JP | 2010-53008 A | 3/2010 |
| JP | 2016-504624 A | 2/2016 |
| KR | 10-1081001 | 11/2011 |
| KR | 20170009255 A | 1/2017 |

OTHER PUBLICATIONS

Cohn and Duelli, "Ternary pseudorandom encoding of Fourier transform holograms", Journal of the Optical Society of America, A, Optics, image science and vision, Jan. 1, 1999, pp. 71-84.
Cohn and Liu, "Pseudorandom encoding of fully complex modulation to biamplitude phase modulators", Proceediings of SPIE, vol. 2894, Sep. 25, 1986, pp. 42-45.
International Search Report dated Nov. 4, 2019 for International Application No. PCT/EP2019/072509, 3 pages.
United Kingdom Combined Search and Examination Report dated Feb. 26, 2019 for Great Britain Application No. 1813773.7, 6 pages.

* cited by examiner

METHOD OF HOLOGRAM CALCULATION

CROSS-REFERENCE TO RELATED APPLICATIONS

This application is a U.S. national phase application of International Patent Application no. PCT/EP2019/072509 filed on Aug. 22, 2019, which claims the benefit of United Kingdom Patent Application no. GB 1813767.9 filed on Aug. 23, 2018 and United Kingdom Patent Application no. GB 1813773.7 filed on Aug. 23, 2018.

FIELD

The present disclosure relates to a method of calculating a hologram and a holographic engine arranged to calculate a hologram. More specifically, the present disclosure relates to a method of computer-generating a fully-complex hologram and a holographic computational engine arrange to calculate a fully-complex hologram. The present disclosure also relates to an algorithm for calculating a hologram comprising a 2D array of amplitude and phase values and a hologram engine arranged to calculate a hologram comprising a 2D array of fully-complex hologram data values. Some embodiments relate to a holographic projector arranged to form a holographic reconstruction using the generated hologram. Some further embodiments relate to a head-up display, head-mounted display or near-eye device including the holographic projector.

BACKGROUND AND INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram, "CGH", may be calculated by a technique based on a mathematical transformation such as a Fresnel or Fourier transform. These types of holograms may be referred to as Fresnel or Fourier holograms. A Fourier hologram may be considered a Fourier domain representation of the object or a frequency domain representation of the object. A CGH may also be calculated by coherent ray tracing or a point cloud technique, for example.

A CGH may be encoded on a spatial light modulator, "SLM", arranged to modulate the amplitude and/or phase of incident light. Light modulation may be achieved using electrically-addressable liquid crystals, optically-addressable liquid crystals or micro-mirrors, for example.

The SLM may comprise a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The SLM may be reflective meaning that modulated light is output from the SLM in reflection. The SLM may equally be transmissive meaning that modulated light is output from the SLM is transmission.

A holographic projector for imaging may be provided using the described technology. Such projectors have found application in head-up displays, "HUD", and head-mounted displays, "HMD", including near-eye devices, for example.

There is disclosed herein an improved display device for complex modulation of light and an improved method of calculating a complex hologram.

SUMMARY

There is provided a holographic projector comprising a display device and a display driver. The display device comprises an array of light-modulating pixels. Each light-modulating pixel is a cell containing liquid crystal operable to modulate both amplitude and phase. The display driver is arranged to drive the display device to display a hologram by independently-driving each light-modulating pixel at a respective complex modulation level selected from a plurality of complex modulation levels each having an amplitude modulation value and phase modulation value. The plurality of complex modulation levels comprises phase modulation values which substantially span at least $37\pi/2$, optionally $2\pi$. At least one of the complex modulation levels has an amplitude modulation value of substantially zero and a phase modulation value of substantially zero.

Each pixel is individually-addressable and capable of modulating both the amplitude and phase of received light. Specifically, each pixel can selectively-attenuate the amplitude of received light and selectively time-delay the received light to introduce a controlled phase delay. Each pixel is configured to receive light, such as a portion of plane wave of coherent light, and output modulated light contributing to an image at a replay plane. Each pixel therefore has control over the amplitude and phase of the modulated light it outputs. The array of pixels comprise a plurality of pixels arranged in rows and columns which collectively provide a phase and amplitude distribution. The phase and amplitude distribution displayed on the array of pixels is a hologram which can be reconstructed by illumination to form a holographic reconstruction or image at a replay plane spatially separated from the array of pixels.

The amplitude and phase modulation applied by each cell is provided by the liquid crystal. Notably, the liquid crystals are operable to modulate both amplitude and phase. A distinction is drawn here with liquid crystals operable to modulate amplitude-only and liquid crystals operable to modulate phase-only. The liquid crystal pixel is operable to modulate both amplitude and phase by applying a voltage across the cell. The modulation behaviour of each cell may be considered on the complex plane. Specifically, the modulation provided by a cell under particular operating conditions, including at a particular voltage, may be represented by a data point on the complex plane wherein the straight-line distance from the origin represented the amplitude modulation value and the angle round anti-clockwise from the positive x-axis represents the phase-delay modulation value. Each point on the complex plane may be considered a complex modulation level. Each liquid crystal in accordance with the present disclosure is not operable at any complex modulation level. That is, not all points on the complex plane are accessible. Each cell is only operable at a plurality of points on the complex plane. Each cell is therefore operable at a plurality of complex modulation levels, wherein the plurality of complex modulation levels is a subset of values on the complex plane.

Notably, the liquid crystal pixel in accordance with the present disclosure is configured to provide a plurality of complex modulation levels which substantially span at least $3\pi/2$ in the complex plane. The plurality of possible complex modulation levels includes a range of phase values from a minimum phase value to a maximum phase value. The term "span" is used herein to refer to the range of accessible phase values in the plurality of complex modulation levels. The range of accessible phase values is the difference between the maximum phase value and the minimum phase value in the plurality of complex modulation levels. The plurality of complex modulation levels which substantially span at least $3\pi/2$ in the complex plane are mostly distributed on an arc in the complex plane, wherein the arc has an angle of at least $3\pi/2$. That is, if you draw a straight-line from each end point of the arc to the origin, the angle between the two straight-lines is at least $3\pi/2$. In some embodiments, the phase modulation levels substantially span at least $2\pi$. In these embodiments, the arc is substantially a full circle or ellipse or loop around the origin. Further notably, in addition to this range of phase values, at least one of the accessible complex modulation levels has an amplitude modulation value of substantially zero and a phase modulation value of substantially zero. That is, at least one of the available complex modulation levels may be represented at the origin or very near the origin of the complex plane.

The inventors have found that good quality holographic reconstructions can be formed if (i) the range of available modulation levels span at least $3\pi/2$ in phase (preferably, a full $2\pi$) and (ii) one of the modulation levels provides substantially zero amplitude and zero phase modulation (i.e. the origin of the complex plane). In particular, the inventors have found that it is highly advantageous to provide the zero-intensity point at the centre of the complex plane. It was found that the zero point is beneficial because complex data values of the hologram which are relatively far from the circumference of the characteristic curve can be set to zero amplitude—zero phase in order to prevent these points from adding noise. The number of points which are set to zero amplitude may be controlled by a threshold radius (absolute value of the complex data). This cannot be achieved in a phase-only modulation scheme, for example, which instead might employ a noise border to effectively dump light (see, for example, granted UK patent 2501112).

The liquid crystal may be a eutectic mixture of liquid crystalline molecules. The liquid crystal may be twisted nematic liquid crystal. The twisted nematic liquid crystal may have a twist of 30 to 60 degrees. It is found that plurality of complex modulation levels required may be achieved with twisted nematic liquid crystal having a twist of 30 to 60 degrees. In some embodiments, the twist angle is 40 to 50 degrees, for example, 45+/−2 degrees.

In some embodiments, the liquid crystal is at least one selected from the group comprising: an isothiocyanato biphenyl molecule; an alkylsulphanyl or alkylselanyl biphenyl molecule; and isothiocyanatoterphenyls.

In some embodiments, the product of the cell gap of the cell and the birefringence of the liquid crystal (the so-called path difference) is greater than 2 µm. The inventors have identified that if the path difference is at least 2 µm, an improved holographic reconstruction can be formed from a fully complex hologram. If the path difference is less than 2 µm, the light modulator is unable to adequately display the fully complex hologram. In this case, a holographic reconstruction may still be formed but the quality is poor. In some embodiments, the path difference is less than 3 µm. the inventors have found that this upper limit provides a good compromise with speed because large path differences lead to slower devices. In some embodiments, the product of the cell gap and the birefringence is 2.5+/−0.2 µm such as 2.35+/−0.15 µm.

The thickness of the cell (known as the cell gap) is an important parameter. If determines how quickly the liquid crystal can be switched between modulation levels. If the cell is too thick, the switching time may become unacceptably large. The inventors have found that in order to provide the plurality of complex modulation levels described whilst maintaining acceptable switching speed—e.g. for video rates such as required for real-time holography—the birefringence of the liquid crystal should be at least 0.25. For some applications, it is advantageous if the birefringence is at least 0.30. Increasing the birefringence reduces the cell gap and improves speed provided that liquid crystal viscosity does not increase at the same time.

The light source may be an integral part of the projector or it may be a separate or removable component such as a modular component. In some embodiments, the holographic projector includes a light source arranged to illuminate the array of light-modulating pixels with polarised light having a polarisation direction parallel to the n-director of the liquid crystal in the layer immediately adjacent the surface of the cell which receives the light.

There may be any number of complex modulation levels. The inventors have found for the holographic projector described there is little value in having more than 512 modulation levels. In fact, good performance can be achieved with no more than 128 or 64 complex modulation levels.

Each complex modulation level may be provided by applying a respective voltage across the cell. It may be advantageous for the voltage to be in the range 0 to 12 V. It may be further advantageous for the voltage to be in the range 0 to 6 V.

The inventors have identified that the plurality of complex modulation levels described may be provided using cells having a response to voltage which substantially fits a line in the complex plane, wherein the line is a spiral towards the origin comprising a first section which is a substantially closed loop around the origin and a second section which extends inwardly from the circumference of the loop towards the origin of the complex plane. The plurality of complex modulation levels having a phase component which substantially spans $3\pi/2$ may be provided on the first section. The first section may follow any path which spirals around the origin such as a circle or ellipse. The second section may extend to the origin thereby providing the advantageous zero amplitude—zero phase point. The second section may even extend beyond or past the origin to provide more complex modulation levels. It is found that the claimed device may be readily provided if the second section is substantially spiral or arc-shaped.

A purpose of the second section of the line is to achieve the zero amplitude—zero phase point. In some embodiments, other points on the second section are not used as one of the plurality of allowable complex modulation levels because they may duplicate the phase value of other modulation levels. It is therefore advantageous that the length of the second section is less than half the length of the first section. It is even more advantageous if the second section is less than one quarter the length of the first section.

In some embodiments, the display device is a liquid crystal on silicon device.

The holographic projector may be configured to receive holograms from a separate source or may include a hologram calculation engine. The hologram calculation engine may be arranged to receive an input image comprising a plurality of data values representing amplitude; assign a random phase value to each data value of the plurality of data values to form a complex data set; perform an inverse Fourier transform of the complex data set; and constrain each complex data value of the complex data set to one of the plurality of complex modulation levels to form the complex hologram.

There is also provided a holographic projector comprising a display device comprising an array of amplitude-only modulating pixels in a one-to-one arrangement with a corresponding array of phase-only modulating pixels to collectively provide a plurality of complex modulation levels comprises phase modulation values which substantially span at least $3\pi/2$, optionally $2\pi$, and wherein at least one of the complex modulation levels has an amplitude modulation value of substantially zero and a phase modulation value of substantially zero. The complex modulation levels may fit a line in the complex plane, wherein the line is a spiral towards the origin comprising a first section which is a substantially closed loop around the origin and a second section which extends inwardly from the circumference of the loop towards the origin of the complex plane.

There is provided a method of calculating a hologram having an amplitude and a phase component. The method comprises (i) receiving an input image comprising a plurality of data values representing amplitude. The method then comprises (ii) assigning a random phase value to each data value of the plurality of data values to form a complex data set. The method then comprises (iii) performing an inverse Fourier transform of the complex data set. The method then comprises (iv) constraining each complex data value of the complex data set to one of a plurality of allowable complex data values, each comprising an amplitude modulation value and a phase modulation value, to form a hologram. As described above, the phase modulation values of the plurality of allowable complex data values substantially span at least $3\pi/2$, optionally $2\pi$, and at least one of the allowable complex data values has an amplitude modulation value of substantially zero and a phase modulation value of substantially zero.

The method described calculates a hologram comprising complex data values. The inventors have found that a hologram giving rise to a good quality reconstruction can be calculated quickly if the hologram data values are complex and constrained to a plurality of acceptable values including zero amplitude—zero phase so that noise can be minimised. In particular, a good quality holographic reconstruction can be formed using only one (inverse) Fourier transform. In contrast, phase-only holography may require, for example, 10 iterations of the algorithm described herein in order to achieve comparable image quality. The method of calculating a hologram disclosed herein is therefore faster because fewer calculations are required to achieve the same level of image quality. The inventors have found that the difficulties introduced by using complex hologram data values can be mitigated by constraining the complex values as described. At least one of the allowable complex data values has an amplitude modulation value of substantially zero and a phase modulation value of substantially zero so that noise introduced by constraining the allowable values can be mitigated. The plurality of allowable complex data values substantially span at least $3\pi/2$ because most of the important holographic information is contained in the phase component not the amplitude component.

In some embodiments, the method includes steps for assessing the quality of the holographic reconstruction. Specifically, in some embodiments, the method further comprises (v) performing a forward Fourier transform of the complex data set and (vi) measuring a difference between the amplitude component of the complex data set and the input image.

If the measured difference is greater than a threshold, the method may further comprise: (vii) combining the phase component of the complex data set with the plurality of data values representing amplitude of the input image, or a plurality of data values representing amplitude derived from the input image; (viii) inverse Fourier transforming the complex data set; and (ix) constraining each complex data to one of the allowable complex data values to form a hologram. In these embodiments, an improved hologram is calculated.

The method may comprise repeating the ordered steps (v) to (ix) until the measured difference is less than the threshold. In these embodiments, a yet further improved hologram is calculated.

The method may further comprise defining the line in the complex plane on which the complex modulation levels lie. Specifically, the method may comprise defining a line in the complex plane, wherein the line is a spiral towards the origin comprising a first section which is a substantially closed loop around the origin and a second section which extends inwardly from the circumference of the loop towards the origin of the complex plane. The method may also comprise defining the plurality of allowable complex data values substantially on the line. The line may have the features described above.

The step of constraining may comprise replacing the amplitude and phase component with the amplitude and phase component of the nearest allowable complex data value in the complex plane. This method is simple and fast because it may merely require simple calculation of the shortest distance to each allowable complex data value in order to identify the nearest allowable complex data value.

Alternatively, the method of constraining each complex data value may comprise: (a) if the amplitude component is less than a threshold, replacing the amplitude component and phase component with zero; and (b) if the amplitude component is equal to or greater than the threshold, replacing the amplitude and phase component with the amplitude and phase component of the nearest allowable complex data value in the complex plane.

Embodiments including this method of constraining are advantageous because a large number of low amplitude complex data values are generated in the hologram. Complex values near the origin (i.e. less than the threshold) are assigned the complex modulation level having zero amplitude and zero phase. This reduces the impact of the constraining step on the signal-to-noise ratio of the holographic reconstruction because constraining these low amplitude complex data values to the complex modulation values on the first section of the line in the complex plane would introduce larger errors and therefore significant noise in the image.

Further alternatively, the method of constraining each complex data value may comprise replacing the amplitude and phase component with the amplitude and phase component of the nearest allowable complex data value in the quadrant of the complex plane containing the complex data value. Embodiment including this method of constraining are advantageous because fewer of the possible complex modulation levels need to be assessed thereby reducing the computational processing required as part of the constraining step described herein.

In some embodiments, there is provided a method of holographic projection comprising: calculating the hologram as above; displaying the hologram on the light-modulating pixels of at least one display device; and illuminating the display device with coherent light and performing a Fourier transform to generate a holographic reconstruction at a replay plane.

The hologram may be displayed on one fully complex spatial light modulator or an amplitude-only modulator and a phase-only modulator arranged as a pair. In some embodiments, the light-modulating pixels are provided on one display device, wherein each light-modulating pixel is operable to modulate both amplitude and phase in accordance with a plurality of complex modulation levels, wherein the plurality of complex modulation levels is the plurality of allowable complex data values.

There is also provided a holographic projector comprising: a display device comprising an array of light-modulating pixels, wherein each light-modulating pixel is a cell containing liquid crystal operable to modulate both amplitude and phase; a display driver arranged to drive the display device to display a hologram by independently-driving each light-modulating pixel at a respective complex modulation level selected from a plurality of complex modulation levels each having an amplitude modulation value and phase modulation value, wherein the response of each cell to a voltage applied across the cell substantially fits a line in the complex plane, wherein the line is a spiral towards the origin comprising a first section which is a substantially closed loop around the origin and a second section which extends inwardly from the circumference of the loop towards the origin of the complex plane.

There is provided a liquid crystal cell for a spatial light modulator, wherein the liquid crystal cell comprises twisted nematic liquid crystal having a birefringence greater than 0.25, optionally greater than 0.3, and a twist angle of 30 to 60 degrees, such as 40 to 50 degrees, wherein the product of the cell gap of the cell and the birefringence of the liquid crystal is greater than 2 μm.

It has been found that a holographic reconstruction of acceptable quality can be formed from a "hologram" containing only phase information related to the original object. Such a holographic recording may be referred to as a phase-only hologram. A holographic reconstruction can also be formed from an amplitude-only hologram.

However, the present disclosure relates to forming a holographic reconstruction using amplitude and phase information related to the original object. In some embodiments, this is achieved by complex modulation using a so-called fully complex hologram which contains both amplitude and phase information related to the original object. Such a hologram may be referred to as a fully-complex hologram because the value (e.g. grey level) assigned to each pixel of the hologram has an amplitude and phase component. The value (e.g. grey level) assigned to each pixel may be represented as a complex number having both amplitude and phase components. In some embodiments, a fully-complex computer-generated hologram is encoded on a single spatial light modulator.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

The term "hologram" is used to refer to the recording which contains amplitude and phase information about the object. The term "holographic reconstruction" is used to refer to the optical reconstruction of the object which is formed by illuminating the hologram. The term "replay plane" is used herein to refer to the plane in space where the holographic reconstruction is fully formed. The term "replay field" is used herein to refer to the sub-area of the replay plane which can receive spatially-modulated light from the spatial light modulator. The terms "image" and "image region" refer to areas of the replay field illuminated by light forming the holographic reconstruction. In embodiments, the "image" may comprise discrete spots which may be referred to as "image pixels".

The terms "encoding", "writing" or "addressing" are used to describe the process of providing the plurality of pixels of the SLM with a respect plurality of control values which respectively determine the modulation level of each pixel. It may be said that the pixels of the SLM are configured to "display" a light modulation distribution in response to receiving the plurality of control values.

The term "light" is used herein in its broadest sense. Some embodiments are equally applicable to visible light, infrared light and ultraviolet light, and any combination thereof.

Some embodiments describe 1D and 2D holographic reconstructions by way of example only. In other embodiments, the holographic reconstruction is a 3D holographic reconstruction. That is, in some embodiments, each computer-generated hologram forms a 3D holographic reconstruction.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration for Light Modulation

Figure 1:
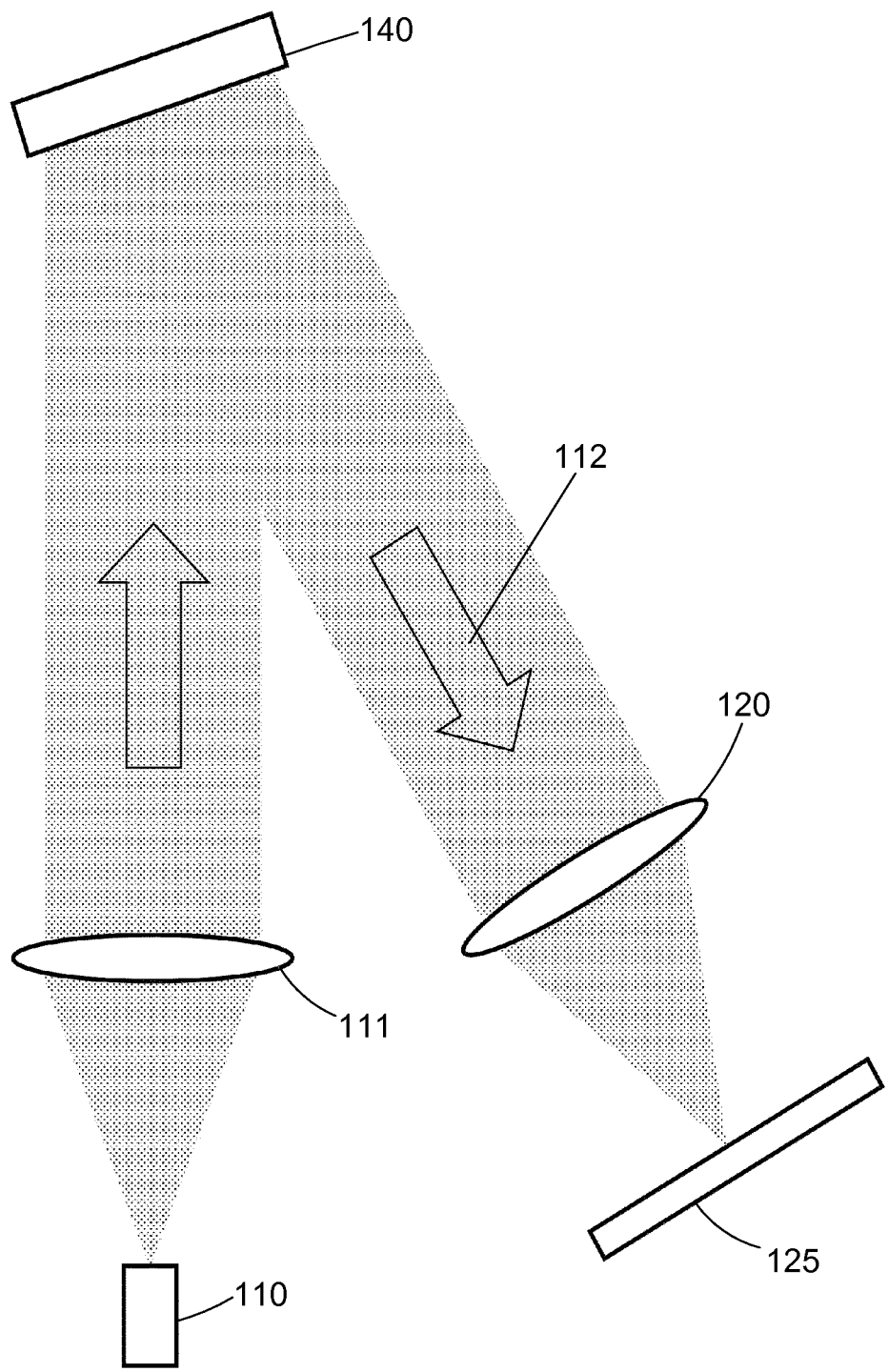
FIG. 1 is a schematic showing a reflective SLM producing a holographic reconstruction on a screen.

FIG. 1 shows an embodiment in which a fully-complex computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

The position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform. However, in other embodiments, the Fourier transform is performed computationally by including lensing data in the hologram (i.e. in the holographic data). That is, the hologram includes data representative of a lens as well as data representing the object. It is known in the field of computer-generated hologram how to calculate holographic data representative of a lens. The holographic data representative of a lens may be referred to as a software lens. For example, a phase-only holographic lens may be formed by calculating the phase delay caused by each point of the lens owing to its refractive index and spatially-variant optical path length, and setting the amplitude value of each pixel to unity. For example, the optical path length at the centre of a convex lens is greater than the optical path length at the edges of the lens. An amplitude-only holographic lens may be formed by a Fresnel zone plate and using a phase-delay of zero for each pixel. It is also known in the art of computer-generated hologram how to combine holographic data representative of a lens with holographic data representative of the object so that a Fourier transform can be performed without the need for a physical Fourier lens. In some embodiments, lensing data is combined with the holographic data by addition such as simple addition or vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may include grating data—that is, data arranged to perform the function of a grating such as beam steering. Again, it is known in the field of computer-generated holography how to calculate such holographic data and combine it with holographic data representative of the object. For example, a phase-only holographic grating may be formed by modelling the phase delay caused by each point on the surface of a blazed grating and setting the amplitude component of each pixel to unity. An amplitude-only holographic grating may be simply superimposed on an amplitude-only hologram representative of an object to provide angular steering of an amplitude-only hologram.

However, the present disclosure is not limited to encoding a fully-complex hologram on a single spatial light modulator. In some examples, the amplitude component of a fully-complex computer-generated hologram is encoded on a first spatial light modulator and the phase component of the fully-complex computer-generated hologram is encoded on a second spatial light modulator. In other examples, the real component of the fully-complex hologram is displayed on a first modulator and the imaginary component is displayed on the second modulator.

Figure 2A:
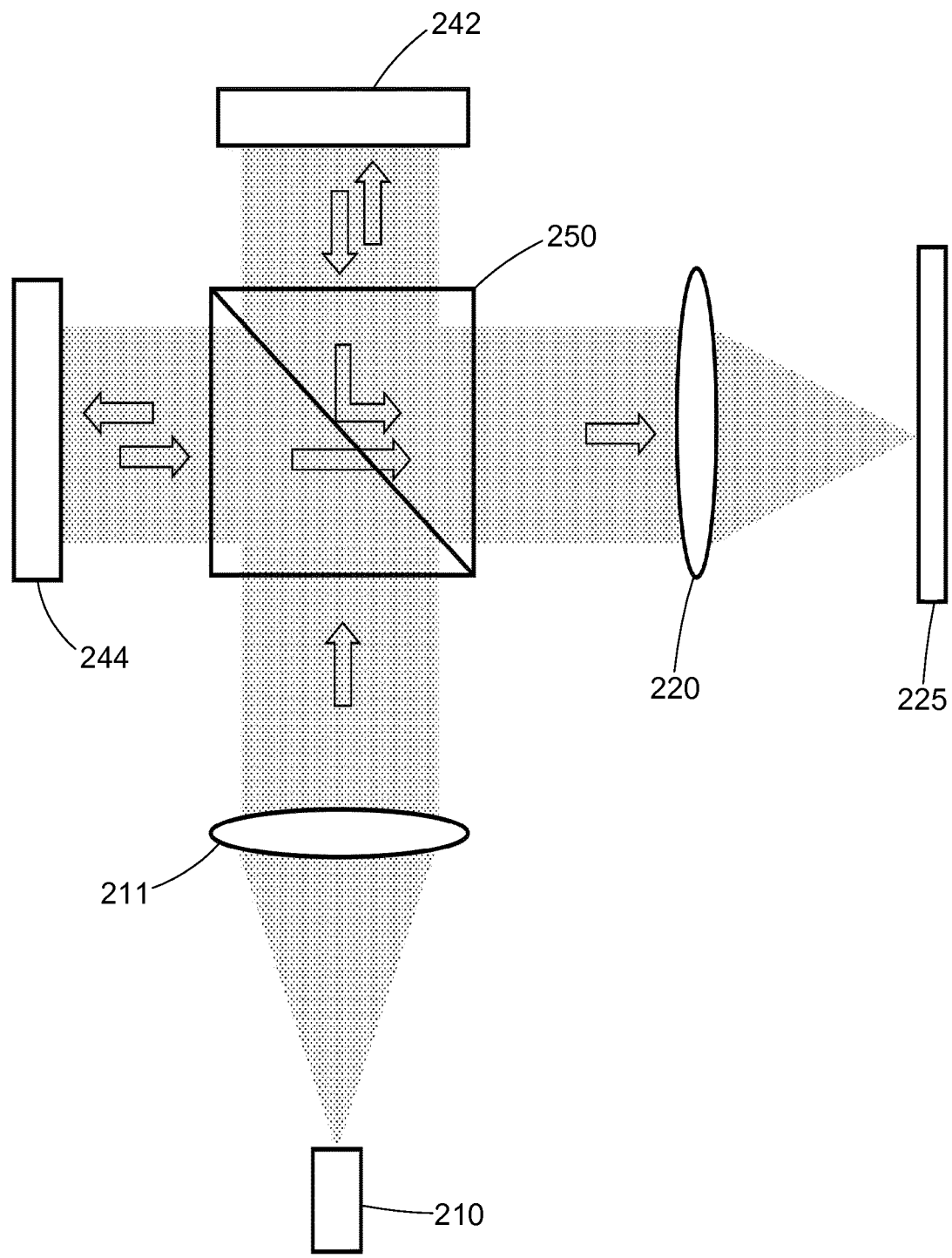
FIG. 2A shows a first example two SLM solution for fully complex light modulation.

FIG. 2A shows an embodiment in which the fully-complex computer-generated hologram is encoded using first and second spatial light modulators. Specifically, the amplitude component of the fully-complex hologram is encoded on a first spatial light modulator 242 and the phase component of the fully-complex hologram is encoded on a second spatial light modulator 244. The first spatial light modulator 242 is an amplitude-only modulator and the second spatial light modulator 244 is a phase-only modulator. The first spatial light modulator 242 and second spatial light modulator 244 are LCOS devices.

In more detail, FIG. 2A shows a light source 210, collimating lens 211 and first spatial light modulator 242 on a first straight line optical path through beam splitter 250. FIG. 2A further shows a second spatial light modulator 244, Fourier transform lens 220 and screen 225 on a second straight line path through the beam splitter. The first straight line path is orthogonal to the second straight line path.

The beam splitter 250 is arranged to receive a planar wavefront of light and output light which is spatially modulated in accordance with the fully-complex hologram. A collimating lens 211 receives light from light source 210 and outputs the planar wavefront of light. The beam splitter is configured to receive the planar wavefront and direct the light to both a first spatial light modulator 242 and a second spatial light modulator 244. The first spatial modulator 242 modulates the amplitude of the light and the second spatial light modulator 224 modulates the phase of the light.

The components are arranged such that light makes two passes of the beam splitter. On a first pass, the beam splitter 250 transmits the planar wave to the first spatial light modulator 242. On a second pass, the beam splitter 250 receives the amplitude-only modulated light from the first spatial light modulator 242 and reflects the light to the Fourier transform lens 220. The second spatial light modulator 244 modulates the phase of the light to form complex modulated light. On the first pass, the beam splitter 250 reflects the planar wave to the second spatial light modulator 244. On a second pass, the beam splitter 250 transmits the light to the Fourier transform lens 220. Fourier transform lens 220 is configured to receive the output light and perform a frequency-space transformation resulting in a holographic reconstruction at the screen 225.

A beam splitter is described by way of example only and the skilled person will be familiar with the various possibilities for directing light to first and second spatial light modulators as described in order to achieve modulation of the light in accordance with the fully-complex hologram. It will be appreciated that the functionality of the first and second spatial light modulators may be reversed. That is, the first spatial light modulator 242 may be the phase-only modulation and the second spatial light modulator 244 the amplitude modulator.

Figure 2B:
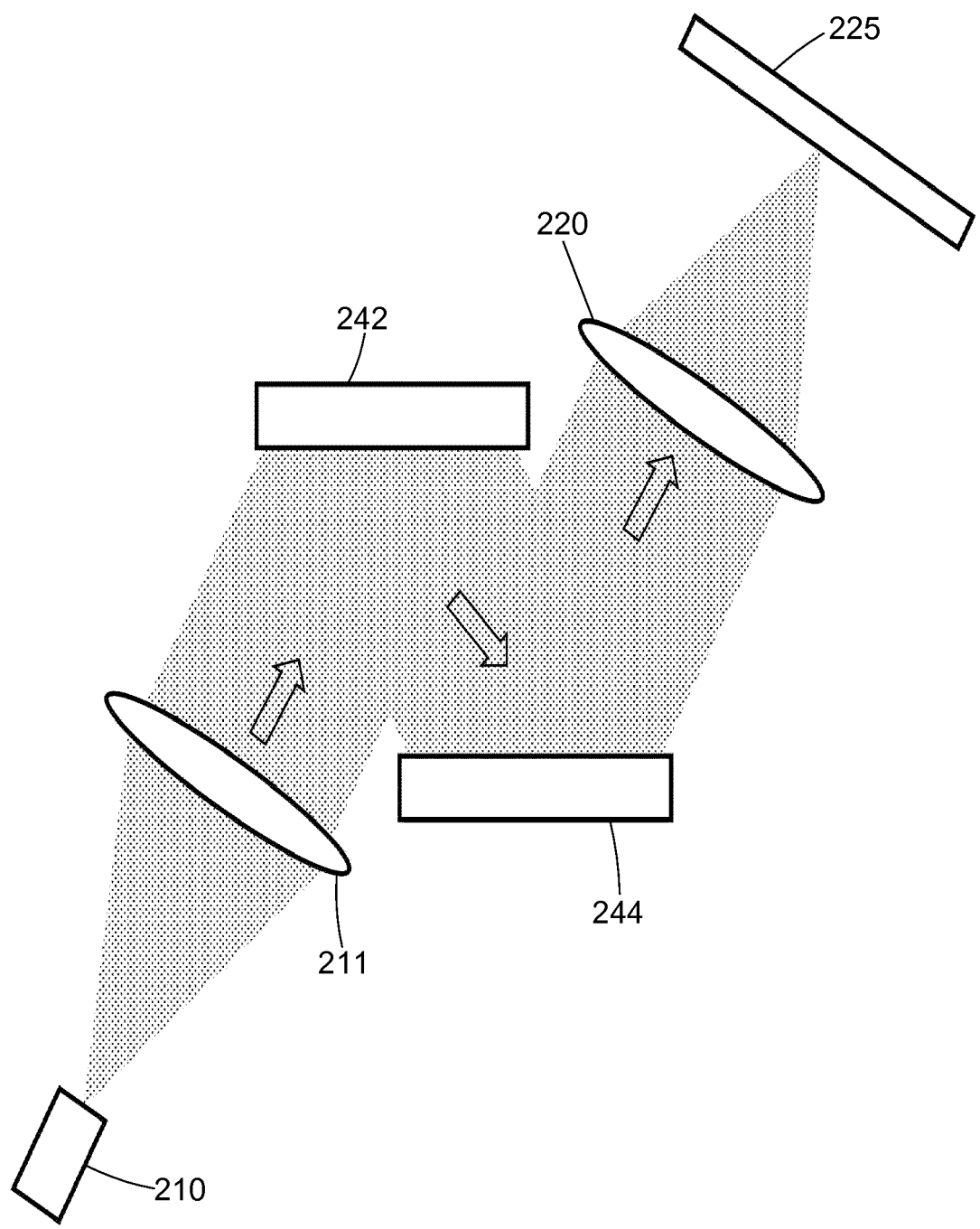
FIG. 2B shows a second example two SLM solution for fully complex light modulation.

FIG. 2B shows an alternative configuration using two spatial light modulators. In summary, the light is received off-axis by the first spatial light modulator and reflected off-axis onto the second spatial light modulator such that a beam splitter is not required. The second spatial light modulator also receives the light off-axis so input and output optical paths do not overlap.

In more detail, FIG. 2B shows a light source 210, collimating lens 211 and first spatial light modulator 242 on a first straight line optical path. FIG. 2A further shows a second spatial light modulator 244, Fourier transform lens 220 and screen 225 on a second straight line path. The first straight line path is substantially parallel to the second straight line path.

A collimating lens 211 receives light from light source 210 and outputs the planar wavefront of light. The first spatial light modulator 242 is arranged to receive the planar wavefront off-axis. That is, the first spatial light modulator 242 is arranged to receive the planar wavefront at non-normal incidence. In some embodiments, the first spatial light modulator 242 is arranged to receive the planar wavefront at an angle of a few degrees—e.g. 1 to 20 degrees—from the normal. The first spatial light modulator 242 is reflective—i.e. comprises a planar reflective surface—and so outputs spatially modulated light at an angle of a few degrees too. The first spatial light modulator 242 modulates the amplitude of the received light. The first spatial light modulator 242 may be a phase-only modulator configured to deliver a particular amplitude (and phase) distribution to the second spatial light modulator 244 using the propagation distance from the first spatial light modulator 242 to the second spatial light modulator 244. In this way, the first spatial light modulator 242 is arranged to modulate the amplitude of the light despite being a phase modulator. It may be said that FIG. 2B shows fully-complex holography "with propagation" which is computationally more complex than using the "without propagation" configuration shown in FIG. 2A. The second spatial light modulator may be arranged to compensate for any unwanted phase modulation introduced by the propagation.

The second spatial light modulator 244 is arranged to receive the amplitude-only modulated light from the first spatial light modulator 242 off-axis. That is, the second spatial light modulator 244 is arranged to receive the amplitude-only modulated light from the first spatial light modulator 242 at non-normal incidence. In some embodiments, the second spatial light modulator 244 is arranged to receive light at the same angle as the first spatial light modulator 242. In other embodiments, the second spatial light modulator 244 is arranged to receive light at a different angle to the first spatial light modulator 242. The second spatial light modulator 244 is also reflective—i.e. also comprises a planar reflective surface—and so outputs spatially modulated light at an angle to the normal. The second spatial light modulator 244 modulates the phase of the light. The first spatial light modulator 242 modulates only the amplitude of the light and the second spatial light modulator 244 modulates only the phase of the light such that full complex modulation is achieved. The second spatial light modulator 244 directs the complex modulated light to the Fourier transform lens 220. Fourier transform lens 220 is configured to receive the output light and perform a frequency-space transformation resulting in a holographic reconstruction at the screen 225.

Figure 2C:
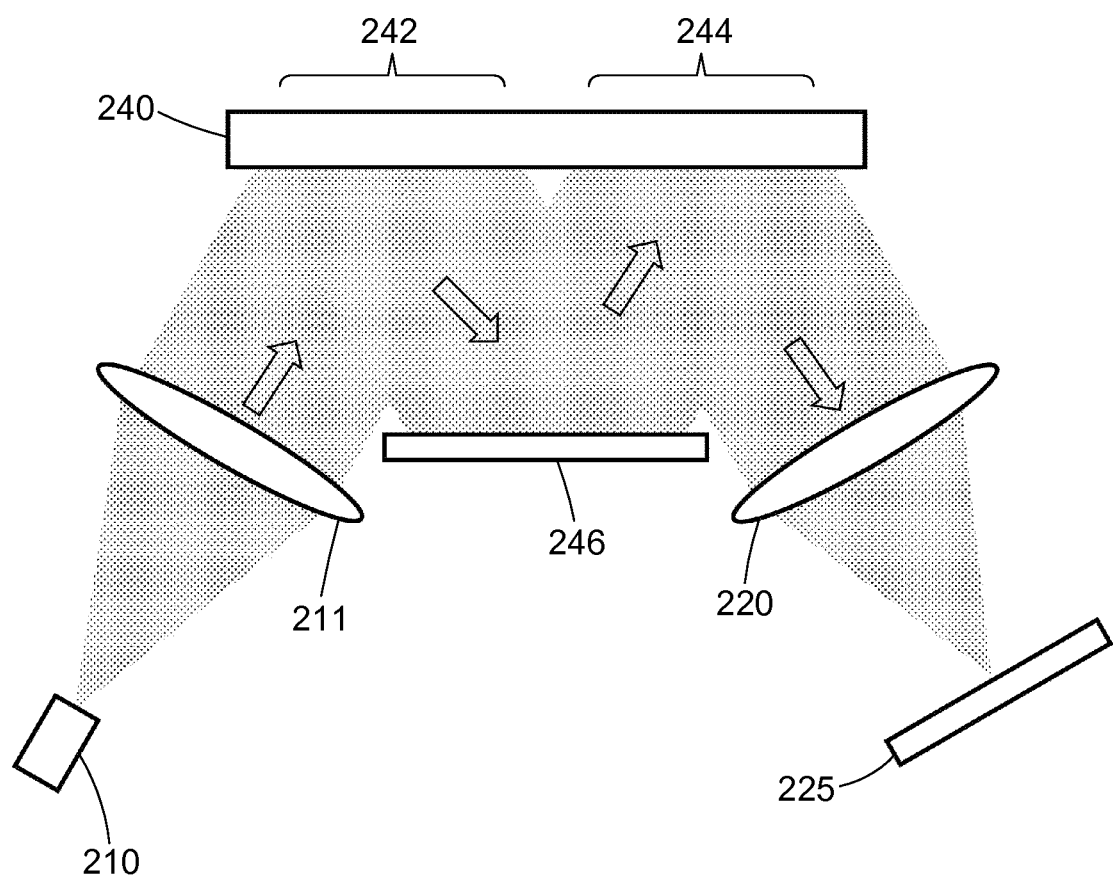
FIG. 2C shows a third example two SLM solution for fully complex light modulation.

FIG. 2C shows a further variation using two different subsets of pixels of a common spatial light modulator 240. The configuration shown in FIG. 2C also uses propagation. A first subset of pixels 242 provide the amplitude modulation and a second subset of pixels 244 provide the phase modulation. A reflector 246 is used to direct light sequentially onto the two subsets of pixels. An off-axis configuration is provided to ensure optical paths do not overlap. In a yet further variation of FIG. 2C (not shown), the first subset of pixels 242 of the common spatial light modulator 240 is replaced by an amplitude-only spatial light modulator and the second subset of pixels 244 of the common spatial light modulator is replaced by a phase-only spatial light modulator.

Spatial Light Modulator

The computer-generated hologram may be encoded on any one of a number of different types of SLM. The SLM, or SLMs, may output spatially modulated light in reflection or transmission. In some embodiments, the SLM is a liquid crystal on silicon, "LCOS", SLM but the present disclosure is not restricted to this type of SLM.

A LCOS device is capable of displaying large arrays of light-modulating elements in a small aperture. Small elements (typically approximately 10 microns or smaller) result in a practical diffraction angle (a few degrees) so that the optical system does not require a very long optical path. It is easier to adequately illuminate the small aperture (a few square centimetres) of a LCOS SLM than it would be for the aperture of a larger liquid crystal device. LCOS SLMs also have a large aperture ratio, there being very little dead space between the pixels (as the circuitry to drive them is buried under the mirrors). This is an important issue to lowering the optical noise in the replay field. Using a silicon backplane has the advantage that the pixels are optically flat, which is particularly important for a phase modulating device.

Figure 3:
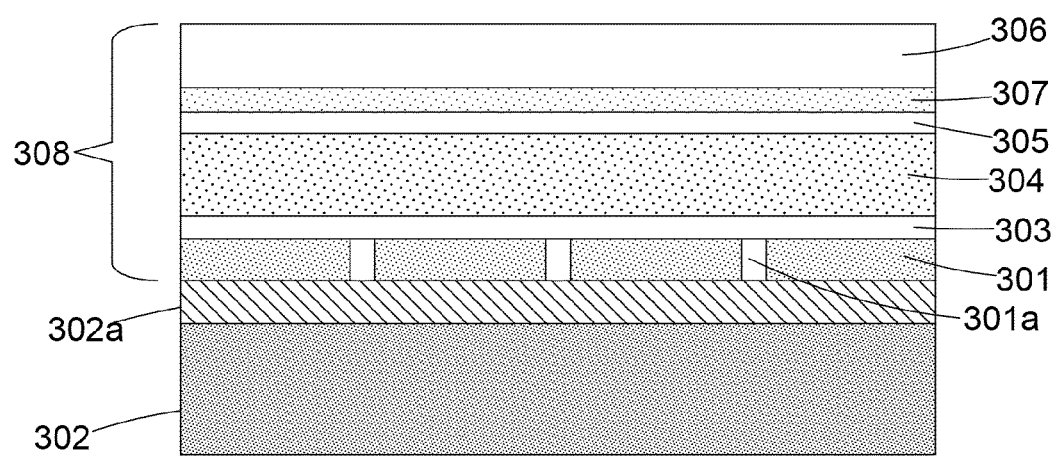
FIG. 3 is a schematic of a reflective LCOS SLM.

A suitable LCOS SLM is described below, by way of example only, with reference to FIG. 3. An LCOS device is formed using a silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable light-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective light-modulating element may be varied, thereby to provide a spatially-variable modulation to light incident thereon. The effect is to provide spatial modulation to the wavefront.

The described LCOS SLM outputs spatially modulated light in reflection but the present disclosure is equally applicable to a transmissive LCOS SLM. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used because light makes two passes of the liquid crystal layer. This greatly improves the switching speed of the liquid crystal (a key advantage for the projection of moving video images).

Spatial light modulators which modulate amplitude-only or phase-only are commercially available and no further description is therefore required. A spatial light modulator comprising pixels each of which may modulate both amplitude and phase at the same time is disclosed herein. Pixels which modulate both amplitude and phase at the same time are described herein as providing fully complex modulation or, simply, complex modulation. This is distinct from pixels which modulate amplitude only or phase only.

A fully-complex hologram in accordance with the present disclosure may be displayed on a single modulator comprising pixels which modulate both amplitude and phase at the same time. A fully-complex hologram in accordance with the present disclosure may also be displayed on two spatial light modulators each comprising amplitude-only or phase-only modulating pixels in which one spatial light modulator is responsible for the amplitude component (or, alternatively, the real component) and the other spatial light modulator is responsible for the phase component (or, alternatively, the imaginary component).

Liquid Crystal for Complex Modulation

Traditionally, nematic liquid crystals have been configured in an amplitude modulation mode; this mode alters the polarisation state of light between crossed polarisers to create a light (transmissive) state and a dark state. Nematic liquid crystals are also presently the best available material for analogue phase modulation in an LCOS device.

Principally, nematic liquid crystal electro-optic effects are described in terms of electrically induced changes of the n-director structures that are set up using specific surface alignment techniques, the electric field acts upon the n-director and not upon the molecule. The n-director is a unit (headless) vector describing the average molecular orientation in an anisotropic fluid.

The n-director structures may be elastically deformed by electric fields; these deformations may or may not couple to fluid flow in the nematic liquid crystal. If the elastic deformations do couple to flow it has a significant impact upon the electro-optic response times.

In some embodiments, a fully-complex computer-generated hologram is represented on a single spatial light modulator comprising pixels each configured for complex modulation. In some embodiments, the light-modulating elements (i.e. the pixels) of the spatial light modulator are cells containing liquid crystal. The optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. For amplitude modulation, the light modulation levels may be considered grey levels. The term "grey level" may also be used for convenience to refer to the plurality of available phase levels in a phase-only modulator even though the different levels are not providing different shades of grey. The term "grey level" is also used herein for convenience to refer to the plurality of available complex modulation levels for the described fully complex modulator.

In some embodiments, the liquid crystal arranged for complex modulation is a twisted nematic liquid crystal. The tilt of the liquid crystals in the cell are affected by the potential difference across the cell. The liquid crystal may therefore be operable at a plurality of modulation levels which may be represented on the complex plane.

Twisted nematic liquid crystal devices are ones in which, typically the n-director is at an angle, for example perpendicular, on one electrode relative to the other. The difference in angles is called the twist. The material will have a positive dielectric anisotropy and when an electric field is applied across the cell a reorientation effect takes place. This reorientation is a combination of splay, bend and twist deformations. Although twisted nematic cells offer good performance for amplitude modulating displays, they are generally overlooked when phase modulation is required due to the complex way in which the phase and polarisation are altered by the twisted structure.

The inventors have recognised that it is possible to use liquid crystal for complex modulation of a complex computer-generated hologram by appropriately selecting the liquid crystals and tuning the properties of the liquid crystals and the cell to the computer-generated hologram. In particular, the inventors have found that an adequate holographic reconstruction can be formed by applying a so-called constrained complex modulation scheme to an appropriate liquid crystal cell. Specifically, the inventors have found that for optimal display of a fully complex hologram, the liquid crystal and cell should be tuned to provide at least $3\pi/2$ of phase modulation and at least one modulation level providing zero amplitude or nominally zero amplitude. Optionally, the liquid crystal and cell are tuned to provide a substantially $2\pi$ of phase modulation and/or a plurality of modulation levels which substantially extend down to zero amplitude.

Figure 4A:
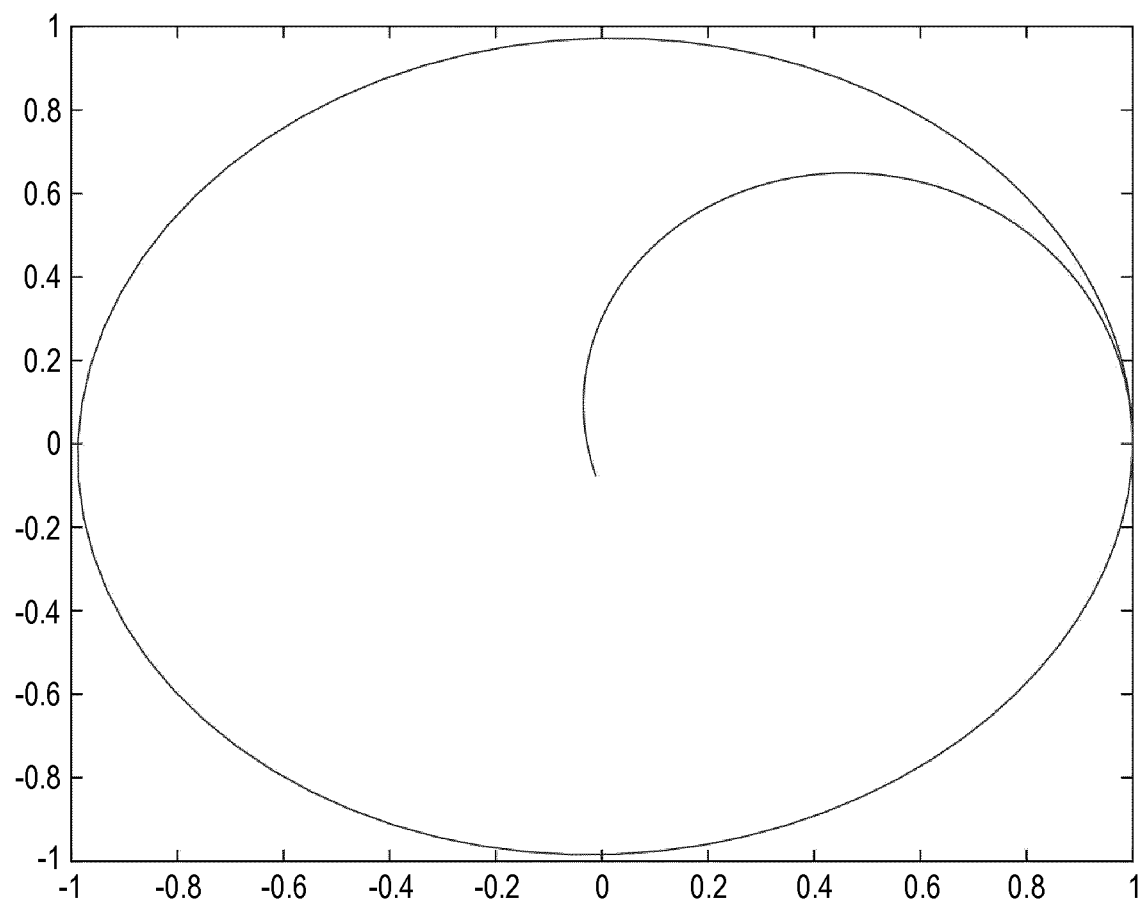
FIG. 4A shows a first example characteristic curve in accordance with embodiments.
Figure 4B:
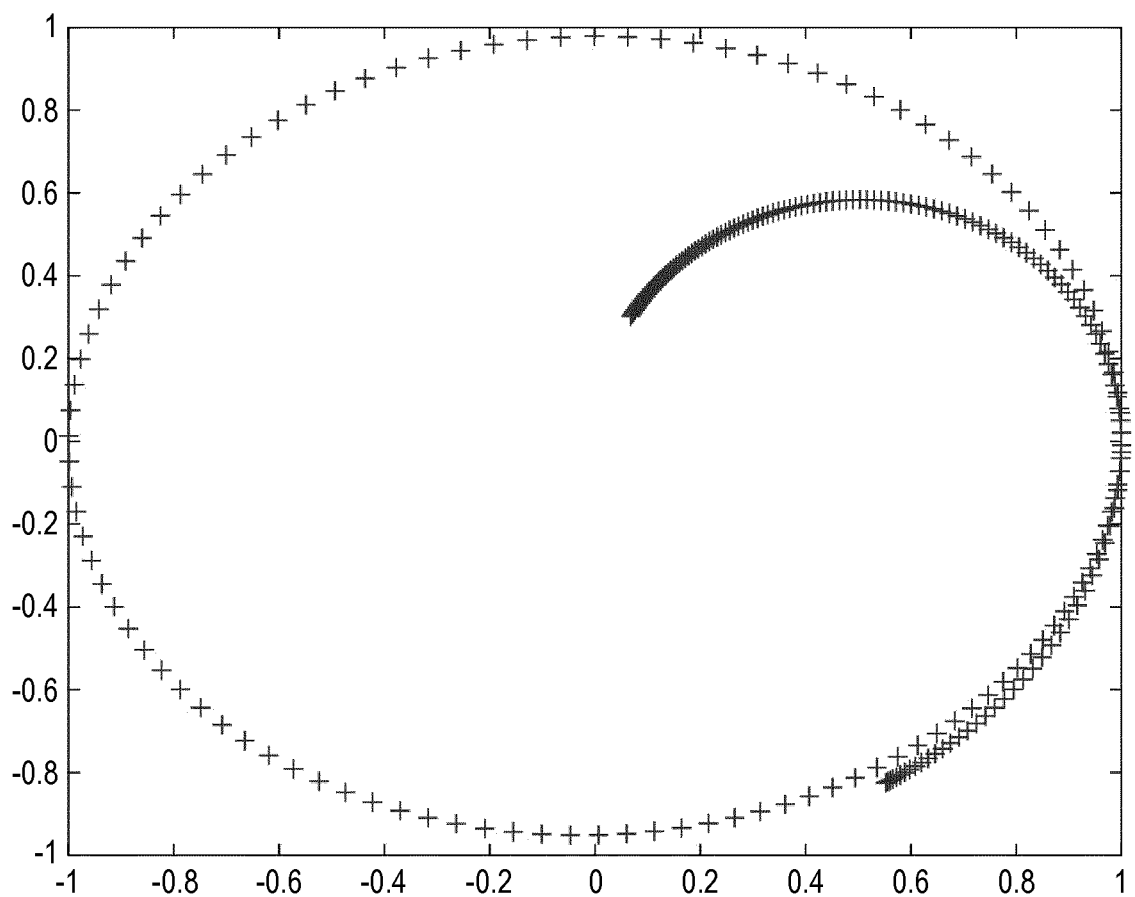
FIG. 4B shows a second example characteristic curve in accordance with embodiments.
Figure 4C:
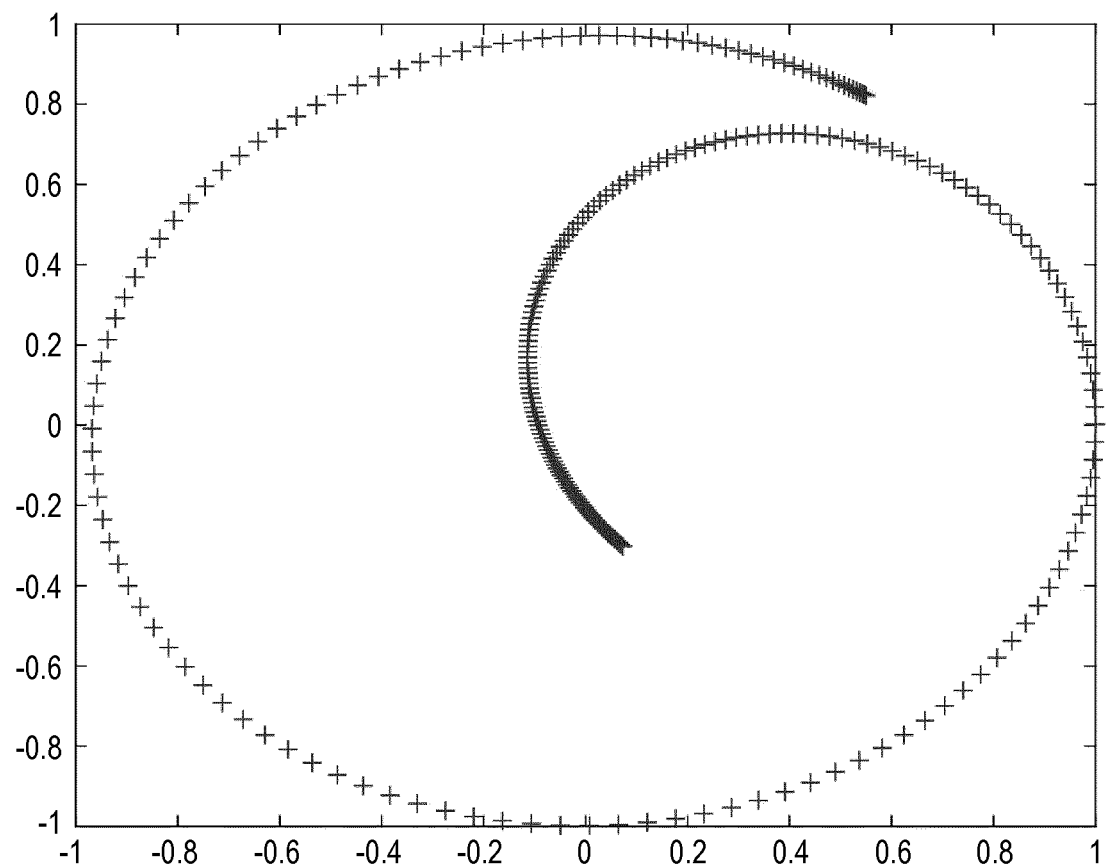
FIG. 4C shows a third example characteristic curve in accordance with embodiments.

FIGS. 4A to 4C show an example of the complex modulation behaviour of a liquid crystal cell in accordance with the present disclosure. The so-called "characteristic curve" shown in each of FIGS. 4A to 4C is a plot in the complex plane of the amplitude and phase of the modulated wave $U_r$ as a function of voltage. Each data point shown is a complex number defining a value of amplitude (distance from origin) modulation and phase (angle around from the horizontal) modulation. It is found that the tilt of the liquid crystals as a function of voltage may be accurately modelled using a three-layer approximation including two relatively large boundary layers which do not respond to voltage and therefore provide a fixed retardance.

When a liquid crystal cell is illuminated with light polarised parallel to the incident director at the front surface of the cell, it is found that the light reflected in the same polarisation has a complex amplitude which satisfies the equation:

$$U_r = e^{-4i\beta_1}\left[\cos^2\gamma + \frac{(e^{4i\beta_1}\alpha^2 - \beta^2)}{\gamma^2}\sin^2\gamma - i\frac{\beta}{\gamma}\sin 2\gamma\right]U_i$$

where $U_r$ is the reflected wave, $U_i$ is the incident wave, $\alpha$ is the twist angle, $\beta$ is the retardance of the liquid crystal, $\beta_1$ is the fixed retardance provided by the boundary layers and $\gamma=\sqrt{\alpha^2+\beta^2}$. The retardance is $\pi d\Delta n/\lambda$ wherein $\Delta n$ is the birefringence of the liquid crystal and d is the cell gap. The term $d\Delta n$ is known as the path difference. When an adequate voltage is applied across the liquid crystal cell, the liquid crystals tilt and the cell provides reduced retardance. The complex modulation provided by each cell is therefore a function of voltage. The behaviour shown in FIGS. 4A to 4C is achieved using a three-layer structure with the configuration 0.3-0.4-0.3 in thickness and $\beta_1=0.75\,\beta$.

The characteristic curves shown in FIGS. 4A to 4C are achieved with light having a wavelength of 589 nm using a twisted nematic liquid crystal having a twist angle $\alpha$ of 45 degrees and a birefringence $\Delta n$ of 0.2667. However, the characteristic curve defined in the present disclosure may be achieved with any birefringence greater than 0.25, optionally 0.3.

The behaviour shown in FIGS. 4A to 4C has been verified by experiment. It is found that a plurality of allowable complex modulation levels fit a line in the complex plane which spirals around the origin and extends inwardly towards the origin. That is, the characteristic curve/line comprises a first section which is a substantially closed loop around the origin and a second section which extends inwardly from the circumference of the loop.

FIG. 4A corresponds to a liquid crystal cell having a path difference of 2.34 μm. The curve starts at 3 o'clock and traces the circumference anti-clockwise, until the voltage is such that the angle of tilt of the n-director at the midline of the cell is 54 degrees. From this point, the curve curls in to the centre point which is at a tilt angle of 76 degrees (achieved at 6 volts). It is found that larger tilt angles (up to 90 degrees) extend the tail of the characteristic curve. Although a continuous characteristic curve is shown in FIG. 4A, in practice, each cell will be driven to provide a plurality of discrete grey levels. In some embodiments, 128 or 256 grey levels are provided. Each grey level may be considered as one data point on the characteristic curve.

The characteristic curve shown in FIG. 4B is achieved with a path difference of 2.43 μm which is 4% higher than the path difference of the cell represented in FIG. 4A. This increase in path difference has resulted in greater than one turn of the circumference and a decrease in the tail. The tail could be recovered (i.e. increased) by increasing the voltage above 6 volts. The overlap in the circumference represents duplicated phase modulation levels which are not needed. There are therefore redundant modulation levels and a higher cell voltage is required for the tail to reach the origin.

The characteristic curve shown in FIG. 4C is achieved with a path difference of 2.25 μm which is 4% lower than the path difference of the cell represented in FIG. 4A. This decrease in path difference has resulted in less than one full turn of the circumference and an increased tailed. Accordingly, less than $2\pi$ of phase modulation levels are provided by the first section. Furthermore, the tail is longer than it needs to be.

The cell represented in FIG. 4A provides the full range of phase modulation values (without duplication of phase levels) and a modulation level of zero amplitude and zero phase is achieved (without overshooting the origin). The inventors have identified that this is conveniently achievable if the total path difference provided by the cell is at least 2 μm. Accordingly, in some embodiments, the path difference is at least 2 μm. In some embodiments, the path difference is 2 to 3 μm. In some embodiments, the path difference is 2.5+/−0.2 μm. In some embodiments, the path difference is 2.35+/−0.15 μm.

Figure 4D:
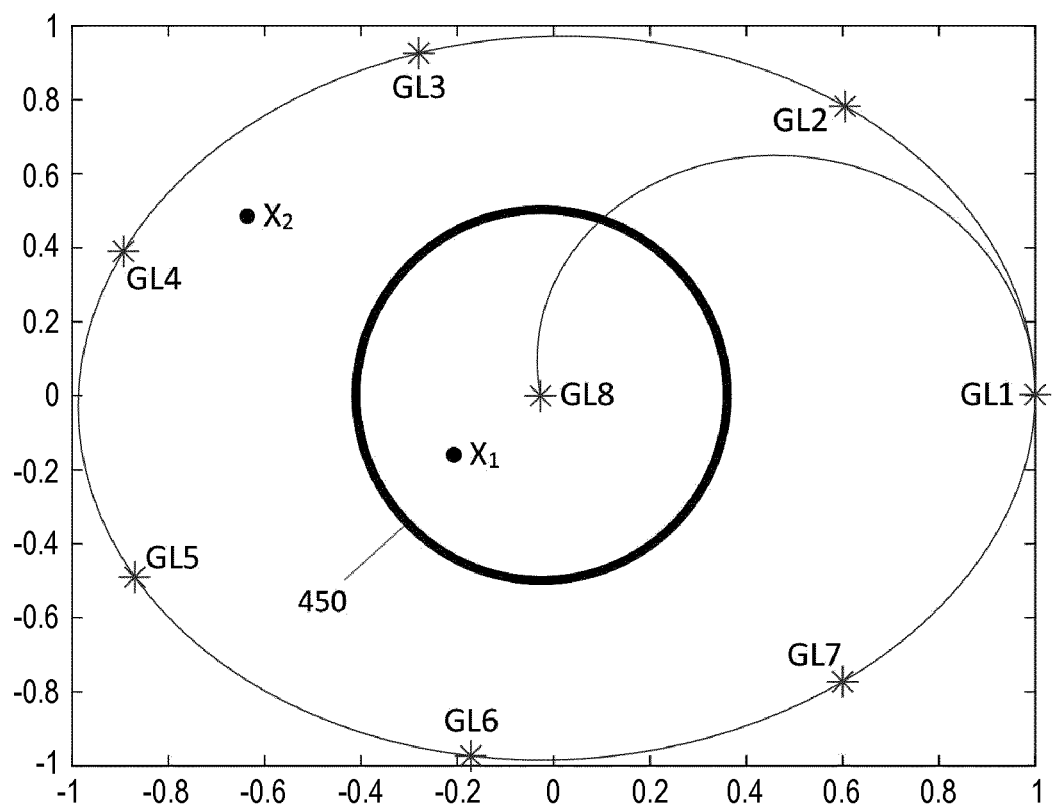
FIG. 4D shows a fourth example characteristic curve in accordance with embodiments.

FIG. 4D shows how a plurality of complex modulation levels, or grey levels, may be defined on the characteristic curve. FIG. 4D shows eight complex modulation levels GL1 to GL8 by way of example only. Any number of modulation levels may be used. In some embodiments, no more than 512 complex modulation levels are provided. In some embodiments, no more than 128 complex modulation levels are provided. In some embodiments, no more than 64 complex modulation levels are provided. Again, notably, one of the complex modulation levels provides zero amplitude and zero phase modulation. This modulation level is the centre of the complex plane and is GL8 is FIG. 4D.

Figure 4E:
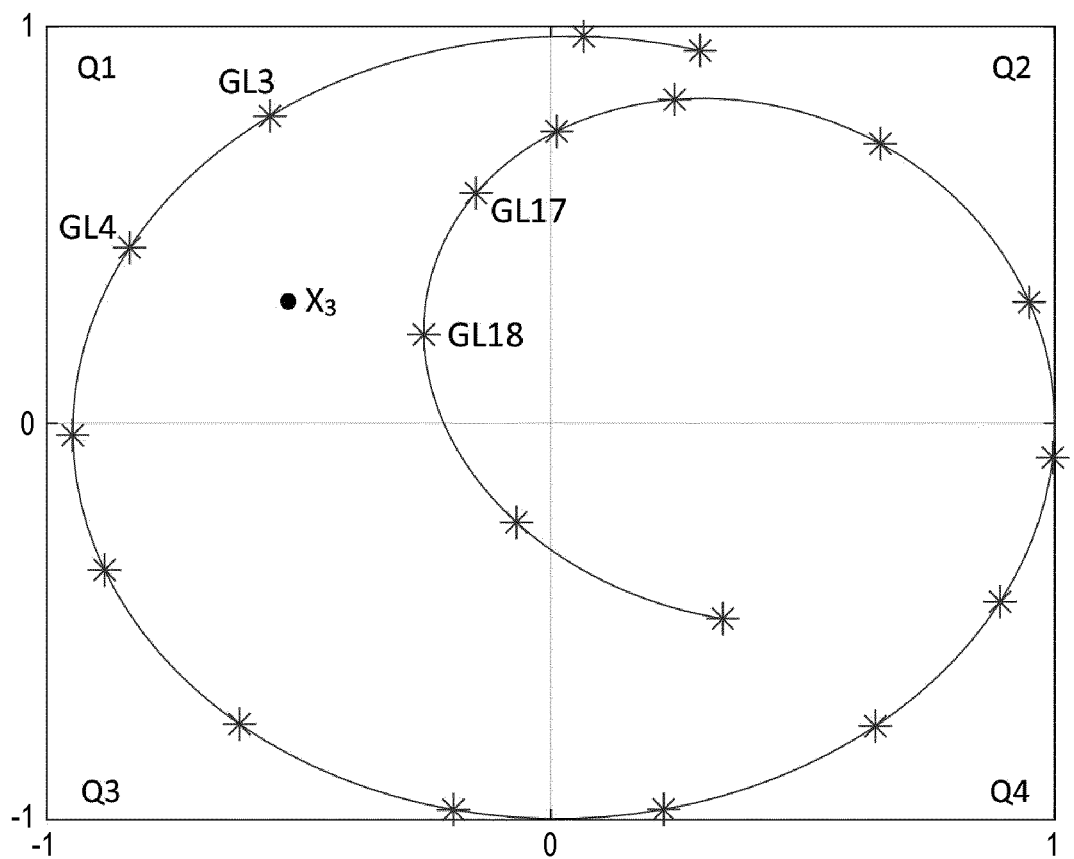
FIG. 4E shows a fifth example characteristic curve in accordance with embodiments.

FIG. 4E shows an example in which the characteristic curve spirals inwardly and has 20 complex modulation levels (each represented by an asterisk). The characteristic curve has a longer tail (second section) than that shown in FIG. 4A, for example. In some embodiments, a plurality of complex modulation levels are assigned within the outer circumference (first section) of the characteristic curve— that is, on the tail. In all variations, the complex modulation levels may be evenly spaced or unevenly spaced or a combination of both such as evenly spaced on the outer circumference and unevenly spaced on the tail, or vice versa. In the example shown in FIG. 4E, the characteristic curve but does not pass through the origin but it may do so by tuning the parameters of the cell.

Hologram Calculation

A Fourier hologram of a 2D image may be calculated in a number of ways, including using algorithms such as the Gerchberg-Saxton algorithm. The Gerchberg-Saxton algorithm may be used to derive a fully-complex hologram in the Fourier domain from amplitude information in the spatial domain (such as a 2D image). The phase information related to the object is effectively "retrieved" from intensity, or amplitude, only information in the spatial domain. Accordingly, a fully-complex Fourier transform of the object may be calculated.

In some embodiments, a computer-generated hologram is calculated from amplitude information using the Gerchberg-Saxton algorithm or a variation thereof. The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\psi_A(x, y)$ and $\psi_B(x, y)$ respectively, is found. The Gerchberg-Saxton algorithm finds solutions to this problem by following an iterative process.

The Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. In accordance with some embodiments, constraints in both the spatial or spectral domain are imposed upon the data set. The corresponding computer-generated hologram in the spectral domain is obtained through at least one iteration of an algorithm.

In accordance with some embodiments, an algorithm based on the Gerchberg-Saxton algorithm retrieves the fully-complex data set H[u, v] in the spectral domain which, when Fourier transformed, gives rise to amplitude information T[x, y] representative of a target image in the spatial domain (e.g. a photograph). The fully-complex data set H[u, v] is therefore a holographic representative of the target image.

Figure 5A:
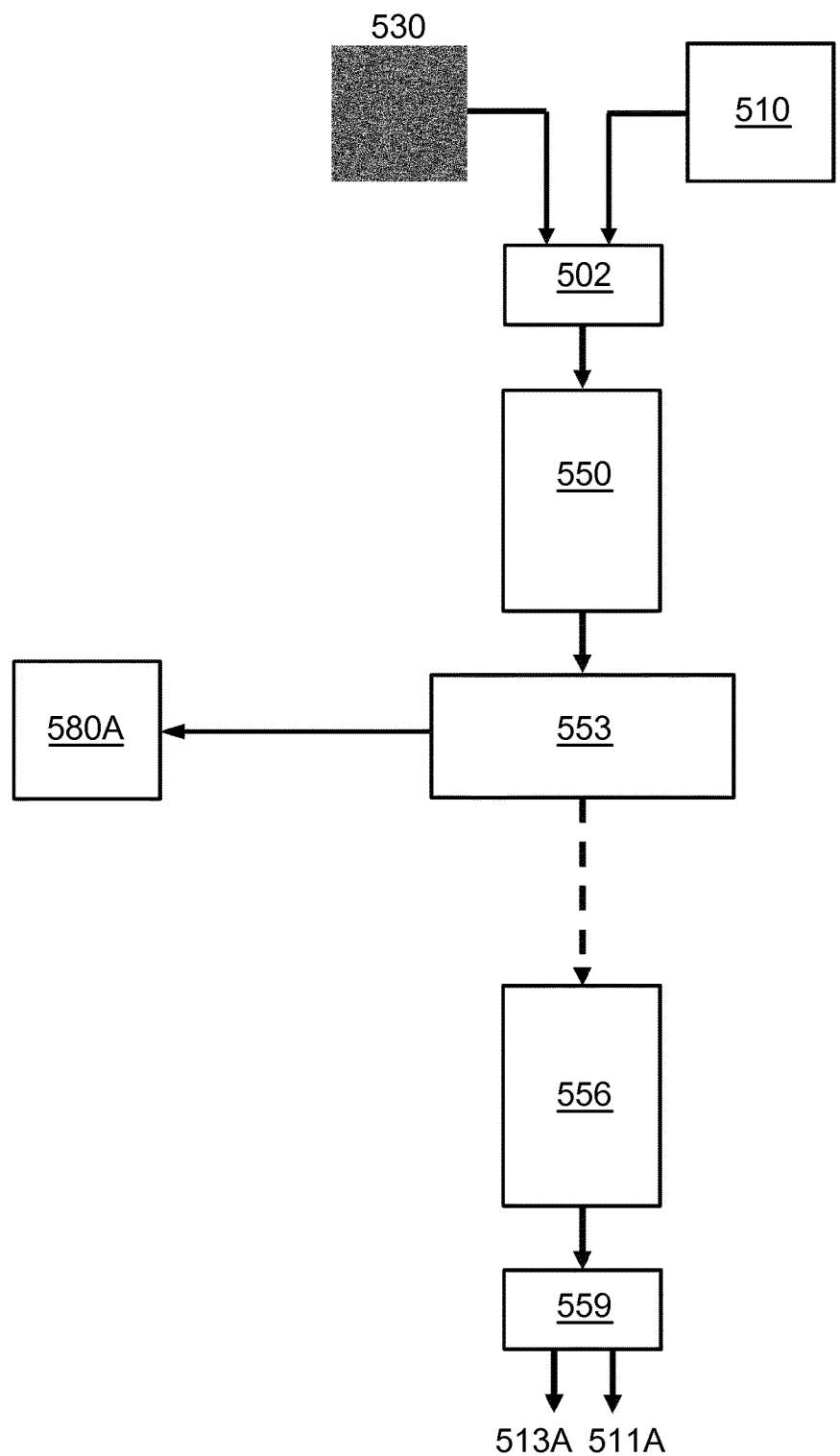
FIG. 5A shows a first iteration of a hologram calculation algorithm in accordance with embodiments.
Figure 5B:
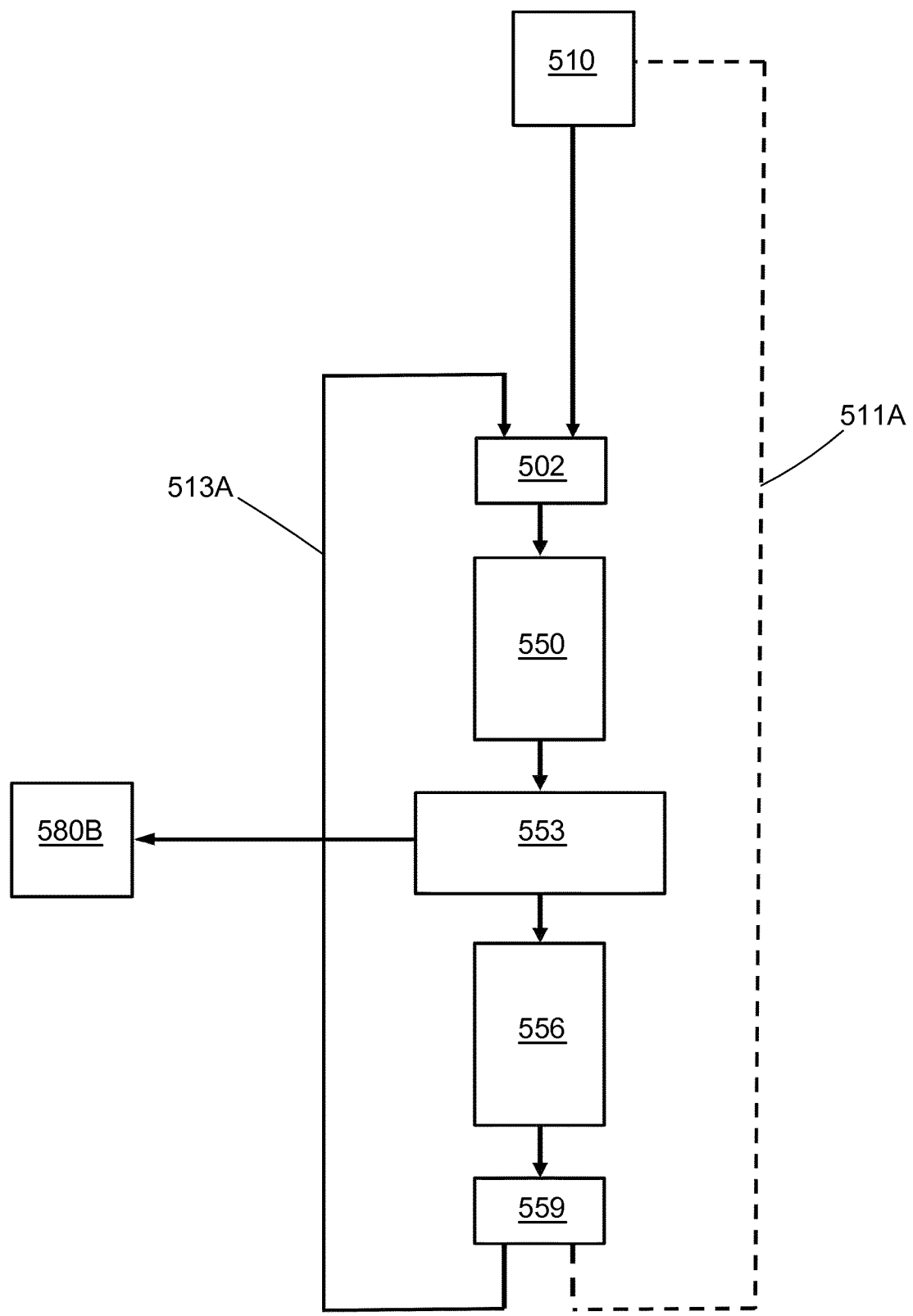
FIG. 5B shows a second and subsequent iterations of a hologram calculation algorithm in accordance with embodiments.
Figure 5C:
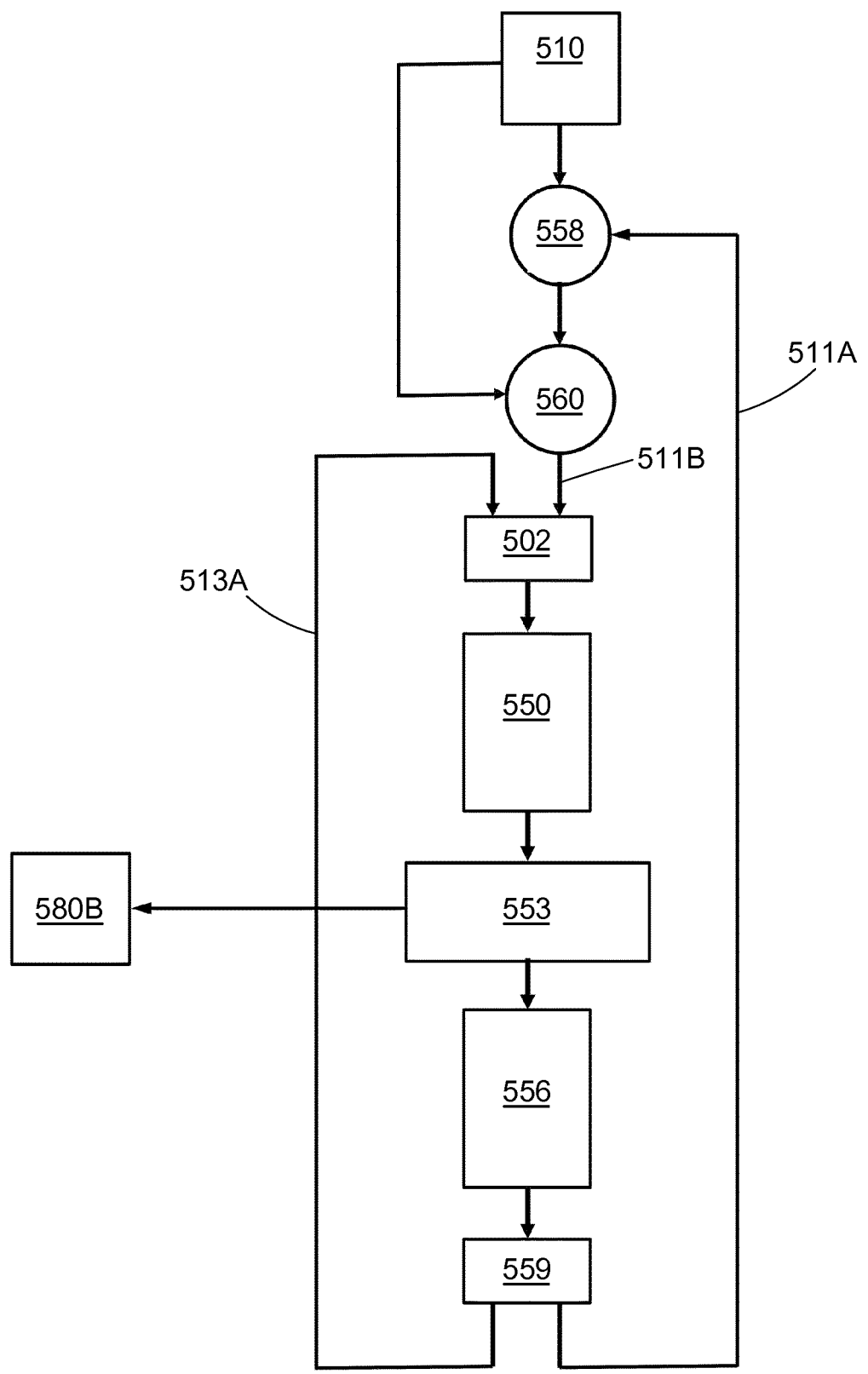
FIG. 5C shows an alternative second and subsequent iterations of a hologram calculation algorithm in accordance with embodiments.

An example algorithm based on the Gerchberg-Saxton algorithm in accordance with some embodiments of the present disclosure is described in the following with reference to FIG. 5. The algorithm is arranged to produce a hologram H(u, v) representing an input image. That is, the algorithm is used to determine a fully complex hologram. FIG. 5A illustrates the first iteration of the algorithm and represents the core of the algorithm. FIG. 5B illustrates optional subsequent iterations of the algorithm. FIG. 5C illustrates alternative subsequent iterations of the algorithm.

The aim of the algorithm represented by FIGS. 5A, 5B and 5C is to output a fully-complex hologram H(u, v) which is a Fourier domain representation of an input image T(x, y) wherein the fully-complex hologram H(u, v) comprises a 2D array of pixels, wherein each pixel has a complex value comprising an amplitude component and a phase component. The input to the algorithm is the input image 510 comprising a 2D array of pixels, wherein each pixel has an amplitude value only. Each pixel of the input image 510 does not have an phase component. The input image 510 may therefore be considered an amplitude or intensity distribution. An example of such an input image 510 is a photograph or one frame of video comprising a temporal sequence of frames. The first iteration of the algorithm starts with a data forming step 502 comprising assigning a random phase value to each pixel of the input image, using a random phase distribution (or random phase seed) 530, to form a first complex data set.

First processing block 550 receives the first complex data set and performs an inverse Fourier transform of the first complex data set to form a second complex data set. It may be said that the first complex data set is representative of the input image in the spatial domain and the second complex data set is representative of the input image in the spectral or Fourier or frequency domain.

Second processing block 553 receives the second complex data and constrains each data value of the second complex data set according to the operating characteristics of the light-modulating elements of the spatial light modulator which will be used to display the hologram. That is, each complex value of the second complex data set is constrained to one of a plurality of possible complex values in accordance with a characteristic of the light modulating elements to form a third complex data set (in the spectral domain). As described above, one of the available modulation levels is zero-intensity.

It will be appreciated that any number of different methods may be used for constraining the complex values of the second complex data set to the available modulation levels of the light modulating elements. In some embodiments, a least-squares fit approach is used to assign a modulation level to each complex value. In some embodiments, the smallest Euclidian distance in the complex plane is used to identify the closest modulation level for each complex data value of the second complex data set.

In some embodiments, complex values less than a threshold are set to the zero-intensity modulation level at the centre of the characteristic curve and complex values having an amplitude greater than the threshold are constrained to the circumference of the characteristic curve. This approach is referred to herein as thresholding. Two example complex values, $X_1$ and $X_2$, are shown in FIG. 4D. It may be considered that complex values inside the circle 450 are set to zero and complex values outside the circle 450 are assigned the nearest phase value (amplitude is unity) on the circumference by being pushed out radially. See, for example, the complex data value $X_1$ inside the circle 450 which is set to zero. In other words, a complex value of $X_1$ in the hologram is given (i.e. constrained to) GL8. See also, for example, the complex data value $X_2$ which is outside the circle 450 and therefore constrained to the circumference of the characteristic curve by being effectively pushed out radially. Specifically, a complex data value of $X_2$ in the hologram is set to GL4 because that is the nearest allowable complex modulation level on the circumference. In some embodiments, complex values outside of the circle 450 are constrained to the nearest allowable complex value on the circumference of the characteristic curve. Any number of different mathematical approaches to identifying the nearest allowable complex value may be employed. In some embodiments, each complex value outside of circle 450 is constrained to the allowable complex value (i.e. one of GL1 to GL7, in the example of FIG. 4D) on the circumference which is the shortest Euclidian distance away. In some embodiments, each complex value outside of circle 450 is constrained to the allowable complex value on the circumference which has the closest phase value. If the chosen threshold is low, most of the pixels go to phase-only and it is found that the replay field has good efficiency but is noisy. If the chosen threshold is high, a significant number of pixels go to zero and it is found that the replay field has poor efficiency but noise is reduced. Some further comments on these embodiments incorporating thresholding may be found below with reference to FIG. 6.

In some embodiments, such as the embodiment shown in FIG. 4E, at least one non-zero complex modulation level may be assigned on the so-called tail (or second section) of the characteristic curve. In these cases, there may be a choice of which complex modulation level should be assigned. See, for example, complex data value $X_3$ which could conceivably be assigned inwardly on the complex plane to GL18 or outwardly on the complex plane to GL4. It may be said with respect to $X_3$ that there is a plurality of credible modulation levels. The present disclosure encompasses any conceivable approach for selecting the most appropriate complex modulation level for each complex data value of the hologram. In some embodiments, the complex modulation level which is geometrically closest (shortest Euclidian distance) to the complex data value is chosen. In some embodiments, accuracy in the phase component is prioritised over accuracy in the amplitude component because it is found that most the important holographic information is contained in the phase component of the hologram. Therefore, in some embodiments, at least one complex data value is constrained to the complex modulation level having the closest phase component but not the closest amplitude component.

In some embodiments, only the complex modulation levels within the quadrant containing the complex data value are assessed. This approach may be referred to as quadrant searching. In the example of FIG. 4E, only complex modulation levels GL13, GL4, GL17 and GL18 within quadrant Q1 are considered as possible complex modulation levels for $X_3$. In this embodiment, the complex data value is set to the nearest complex modulation level within the same quadrant. That is, within the quadrant containing the complex data value.

In some embodiments, the tail of the characteristic curve does not extend into all four quadrants. For example, the tail may extend into quadrants Q2 and Q4 only. In these embodiments, quadrant searching may be employed for complex data values in quadrants containing at least part of the tail and an alternative approach such as one of the other methods disclosed herein, including thresholding, may be employed for complex data values in the other quadrants.

Returning to the hologram calculation, the constrained values form the third complex data set of FIG. 5A. The third complex data set is a fully-complex hologram 580A representative of the target image T(x, y). In some embodiments, the algorithm therefore stops at this point. However, in other embodiments, the algorithm continues as represented by the dotted arrow in FIG. 5A. In other words, the steps which follow the dotted arrow in FIG. 5A are optional (i.e. not essential to all embodiments).

Third processing block 556 receives the third complex data set and performs a forward Fourier transform of the third complex data set to form a fourth complex data set. It may be said that the fourth complex data set is representative of the input image in the spatial domain.

Fourth processing block 559 receives the fourth complex data set and assesses the amplitude component distribution 511A of the fourth complex data set. Specifically, the fourth processing block 559 compares the amplitude component distribution 511A of the fourth complex data set with the input image 510. If the difference between the amplitude component distribution 511A and the input image 510 is sufficiently small, the fourth processing block 559 determines that the hologram 580A is acceptable. That is, if the difference between the amplitude component distribution 511A and the input image 510 is sufficiently small (e.g. less than an error or threshold), the fourth processing block 559 determines that the hologram 580A is a sufficiently-accurate representative of the input image 510 in the spectral domain. In some embodiments, the phase component distribution 513A of the fourth complex data set is ignored for the purpose of this comparison.

It will be appreciated that any number of different methods for comparing the amplitude component distribution 511A and the input image 510 may be employed and the present disclosure is not limited to any particular method. In some embodiments, a mean square difference between the amplitude component distribution 511A and the input image 510 is calculated. In these embodiments, if the mean square difference is less than a threshold or "error" value, the hologram 580A is deemed acceptable. In these embodiments, the third processing block 556 and fourth processing block 559 therefore act as assessment or check steps which assess the quality of the hologram 580A.

If the fourth processing block 559 determines that the hologram 580A is not adequate, the algorithm progresses further as shown in FIG. 5B. FIG. 5B represents a second iteration of the algorithm and any further iterations of the algorithm.

The phase component distribution 513A of the preceding iteration is fed-back through the processing blocks of the algorithm. The amplitude component distribution 511A is rejected in favour of the amplitude component distribution corresponding to the input image 510. In the first iteration, the data forming step 502 formed the first complex data set by combining an amplitude component distribution corresponding to the input image 510 and a phase component distribution corresponding to a random phase seed 530. However, in the second and subsequent iterations, the data forming step 502 comprises combining (i) the phase component distribution 513A from the previous iteration of the algorithm with (ii) the amplitude component distribution corresponding to the input image 510. The data forming step 502 therefore forms a complex data set by pairing each element of the original amplitude component distribution with the corresponding element of the phase component distribution 513A of the previous iteration.

The complex data set formed by the data forming step 502 of FIG. 5B is then processed in the same way described with reference to FIG. 5A to form second iteration hologram 580B. An explanation of the process is not therefore repeated here. The algorithm may stop when the second iteration hologram 580B has been calculated. However, any number of further iterations of the algorithm may be performed. It will be understood that the third processing block 556 is only required if the fourth processing block 559 is required or a further iteration is required. The algorithm is described as being iterative and convergent. That is, the output hologram generally gets better with each iteration. In practice, however, a point is usually reached at which no measurable improvement is observed or the positive benefit of performing a further iteration is out-weighted by the negative effect of additional processing time.

FIG. 5C represents an alternative for the second and further iterations of the algorithm. That is, FIG. 5C represents an alternative to FIG. 5B. In this alternative, the amplitude component distribution 511A and phase component distribution 513A of the preceding iteration are fed-back through the processing blocks of the algorithm. In the first iteration, the data forming step 502 formed the first complex data set by combining an amplitude component distribution corresponding to the input image 510 and a phase component distribution corresponding to a random phase seed 530. However, in the alternative second and subsequent iterations, the data forming step 502 comprises combining (i) the phase component distribution 513A from the previous iteration of the algorithm with (ii) a modified input image 511B derived from the amplitude component distribution 511A of the previous iteration and the input image 510. The data forming step 502 therefore forms a complex data set by pairing each element of an amplitude component distribution with the corresponding element of a phase component distribution.

The modified input image 511B is calculated by the fifth processing block 558 and sixth processing block 560. Specifically, the fifth processing block 558 calculates a scaled difference between the amplitude component distribution 511A of the previous iteration and the input image 510. That is, the fifth processing block 558 subtracts the amplitude component distribution 511A of the previous iteration from the input image 510, and scales that difference by a multiplier (e.g. less than 1). For the avoidance of doubt, each data value of the array of data values resulting from the subtraction is scaled by the multiplier. Sixth processing block 560 subtracts the scaled difference from the input image 510 to form the modified input image 511B. The complex data set formed by the data forming step 502 of FIG. 5C is then processed in the same way described with reference to FIG. 5B.

In some embodiments, the processing time available for calculating the hologram is limited and this may determine how many iterations are performed. For example, in some embodiments, the holograms are calculated in real-time. In some embodiments, a plurality of holograms are calculated in real-time wherein each hologram corresponds to a respective frame of a sequence of video frames. The inter-frame time may therefore put an upper limit on the time available for calculating the hologram. In some embodiments, the hologram is representative of a frame of a sequence of video frames and the hologram is calculated in the inter-frame period.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Figure 6A:
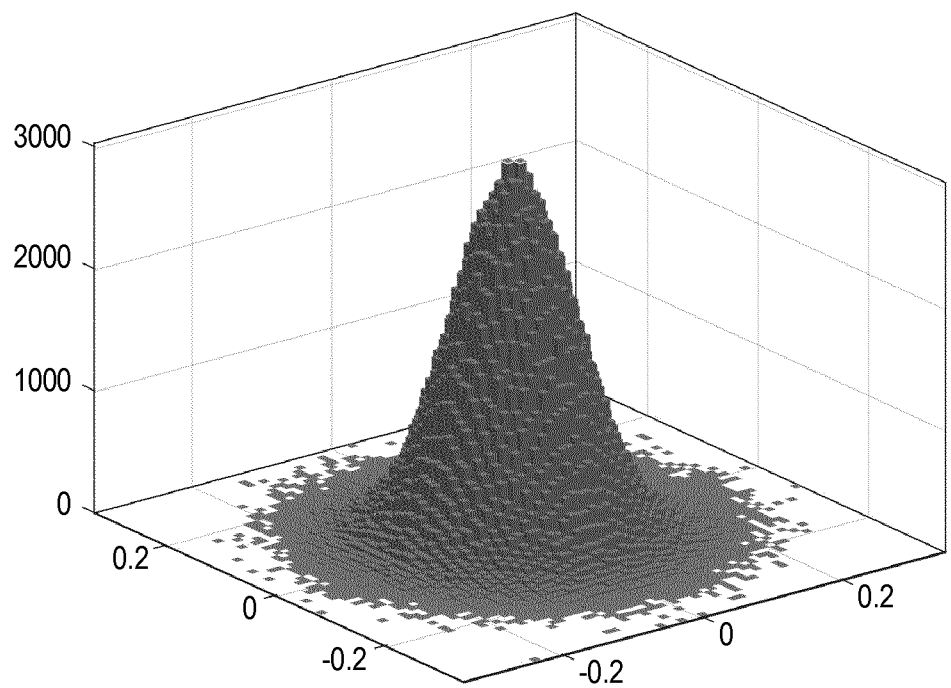
FIG. 6A shows an example distribution of complex values in frequency space.

FIG. 6A shows an example distribution of complex data values after the inverse Fourier transform of FIG. 5A. As can be seen, there are many values near the origin. If these complex data values are assigned a complex modulation level on the outer circumference of the complex curve (i.e. GL1 to GL7 of FIG. 4D), significant errors would be introduced into the hologram because the assigned values are distant from the actual complex values that were calculated by the inverse Fourier transform. The effect of these errors is a significant rise in the signal-to-noise ratio of the holographic reconstruction. Accordingly, in some embodiments including the embodiment represented in FIG. 4D, complex values near the origin (i.e. within circle 450) are assigned GL8 (zero amplitude and zero phase) to reduce the impact of the constraining step on the signal-to-noise ratio of the holographic reconstruction.

Figure 6B:
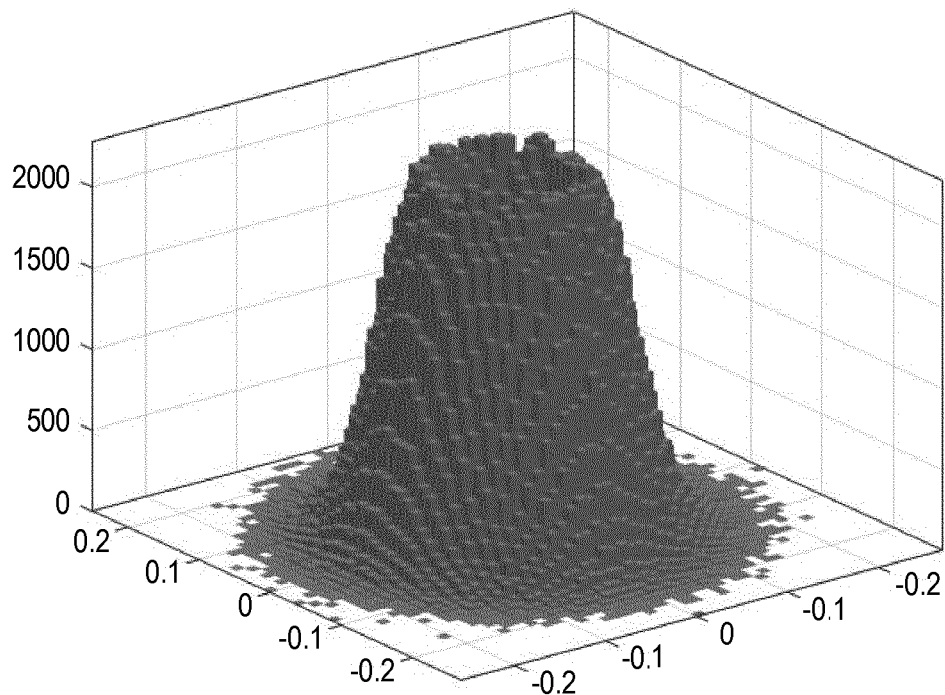
FIG. 6B shows a modified distribution of complex values in frequency space in accordance with embodiments.

FIG. 6B shows the distribution of complex data values after points less than the threshold are set to zero amplitude and zero phase. The distribution shown in FIG. 6B is approximately Gaussian with a $1/e^2$ value of 0.14. In this example, the threshold (radius of circle 450 of FIG. 4D) was 0.005. In this example, there are 908800 pixels and 0.2% of these are less than 0.005. This gave rise to a mean square error of 2090 in the replay field and a zero-order undiffracted spot (an explanation of this phenomenon is given below) having an intensity of 645. In contrast, without GL8 and the described technique of thresholding to GL8, the mean square error was 2111 and the zero-order undiffracted spot had an intensity of 2619. Further iterations of the hologram algorithm may be performed to improve the hologram. For example, if ten iterations of the algorithm are performed, the mean square error is reduced to 1327 but the zero-order has an intensity of 2279. The inventors have found that iterating the algorithm with the constrained fully-complex hologram described herein reduces the signal-to-noise ratio but aggravates the zero-order. However, thresholding the complex values as described herein can be employed to reduce the intensity of the zero-order.

Figure 7A:
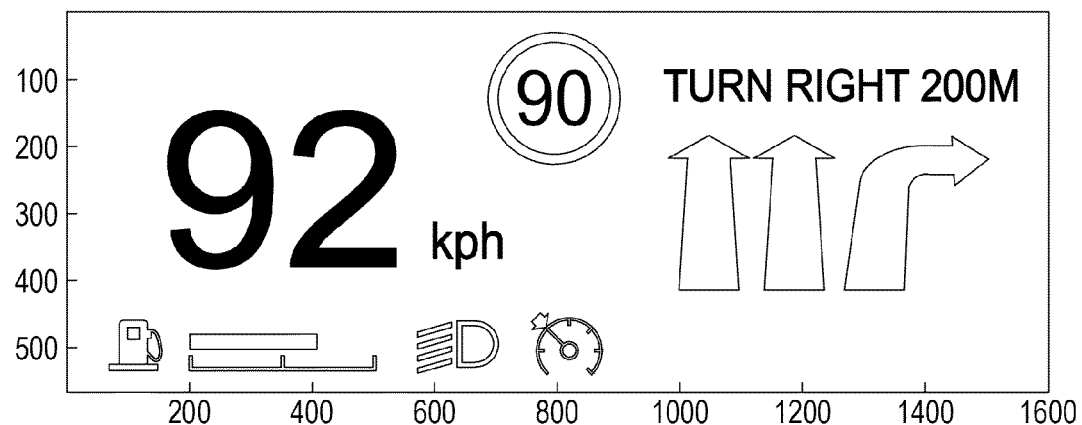
FIG. 7A shows an example target image for holographic projection.
Figure 7B:
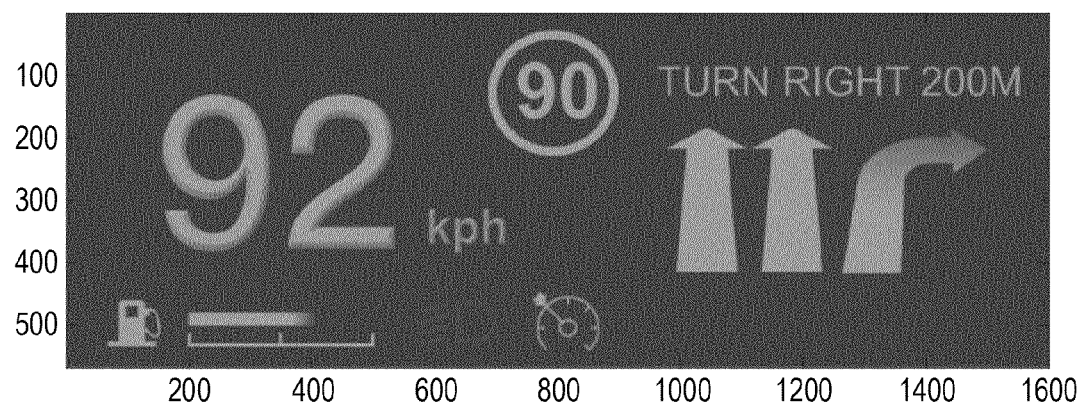
FIG. 7B shows an actual holographic reconstruction in accordance with embodiments.

FIG. 7A shows an example source image and FIG. 7B shows the holographic reconstruction from a hologram calculated using the constraining method illustrated in FIG. 4D and the method illustrated in FIG. 5A. The red component of the image shown in FIG. 7A was used to form the fully-complex hologram.

Additional Features

Some embodiments relate to Fourier holography and Gerchberg-Saxton type algorithms by way of example only. The present disclosure is equally applicable to Fresnel holography and holograms calculated by other techniques such as those based on point cloud methods.

In some embodiments, the light source is a laser. In some embodiments, the replay field is formed on a light receiving surface which may be a screen or a diffuser. The holographic projection system of the present disclosure may be used to provide an improved head-up display (HUD) or head-mounted display. In some embodiments, there is provided a vehicle comprising the holographic projection system installed in the vehicle to provide a HUD. The vehicle may be an automotive vehicle such as a car, truck, van, lorry, motorcycle, train, airplane, boat, or ship.

The quality of the holographic reconstruction may be affect by the so-called zero order problem which is a consequence of the diffractive nature of using a pixelated spatial light modulator. Such zero-order light can be regarded as "noise" and includes for example specularly reflected light, and other unwanted light from the SLM.

In the example of Fourier holography, this "noise" is focussed at the focal point of the Fourier lens leading to a bright spot at the centre of the holographic reconstruction. The zero order light may be simply blocked out however this would mean replacing the bright spot with a dark spot. Some embodiments include an angularly selective filter to remove only the collimated rays of the zero order. Embodiments also include the method of managing the zero-order described in European patent 2,030,072, which is hereby incorporated in its entirety by reference.

In some embodiments, the size (number of pixels in each direction) of the hologram is equal to the size of the spatial light modulator so that the hologram fills the spatial light modulator. That is, the hologram uses all the pixels of the spatial light modulator. In other embodiments, the size of the hologram is less than the size of the spatial light modulator. In some of these other embodiments, part of the hologram (that is, a continuous subset of the pixels of the hologram) is repeated in the unused pixels. This technique may be referred to as "tiling" wherein the surface area of the spatial light modulator is divided up into a number of "tiles", each of which represents at least a subset of the hologram. Each tile is therefore of a smaller size than the spatial light modulator.

The Fourier transform of a rectangular window is a sinc function comprising a central lobe and a series of smaller lobes on either side. The total size of the replay field is a fixed size for a given spatial light modulator. A number of "resolution elements" or "image spots" are formed in the replay field, wherein each resolution element is a sinc function. The total number of resolution elements in the replay field is determined by the number of pixels in the hologram. The spacing between adjacent resolution elements provides the appearance of pixellation in the reconstruction. The inventors have found that if the number of pixels is sufficient, the higher frequency components of adjacent sinc functions may start to interfere. This manifests itself as noise in the reconstruction. In some embodiments, the inventors have addressed this problem by using fewer of the pixels in the hologram and tiling the hologram on the spatial light modulator to increase the spacing between the resolution elements in the reconstruction. In some embodiments, the holographic pattern written to the spatial light modulator comprises at least one whole tile (that is, the complete hologram) and at least one fraction of a tile (that is, a continuous subset of pixels of the hologram).

The holographic reconstruction is created within the zeroth diffraction order of the overall window defined by the spatial light modulator. It is preferred that the first and subsequent orders are displaced far enough so as not to overlap with the image and so that they may be blocked using a spatial filter.

In embodiments, the holographic reconstruction is colour. In examples disclosed herein, three different colour light sources and three corresponding SLMs are used to provide composite colour. These examples may be referred to as spatially-separated colour, "SSC". In a variation encompassed by the present disclosure, the different holograms for each colour are displayed on different area of the same SLM and then combining to form the composite colour image. However, the skilled person will understand that at least some of the devices and methods of the present disclosure are equally applicable to other methods of providing composite colour holographic images.

One of these methods is known as Frame Sequential Colour, "FSC". In an example FSC system, three lasers are used (red, green and blue) and each laser is fired in succession at a single SLM to produce each frame of the video. The colours are cycled (red, green, blue, red, green, blue, etc.) at a fast enough rate such that a human viewer sees a polychromatic image from a combination of the images formed by three lasers. Each hologram is therefore colour specific. For example, in a video at 25 frames per second, the first frame would be produced by firing the red laser for 1/75th of a second, then the green laser would be fired for 1/75th of a second, and finally the blue laser would be fired for 1/75th of a second. The next frame is then produced, starting with the red laser, and so on. In the FSC configuration, the light-modulating pixels of the SLM are calibrated for each different wavelength used. For example, the voltage required to achieve a particular complex modulation level with red light may be slightly different from the voltage required to achieve that complex modulation level with blue light. The skilled person will understand how to perform that calibration in order to provide to complex modulation levels described herein at any wavelength.

An advantage of FSC method is that the whole SLM is used for each colour. This means that the quality of the three colour images produced will not be compromised because all pixels of the SLM are used for each of the colour images. However, a disadvantage of the FSC method is that the overall image produced will not be as bright as a corresponding image produced by the SSC method by a factor of about 3, because each laser is only used for a third of the time. This drawback could potentially be addressed by overdriving the lasers, or by using more powerful lasers, but this would require more power to be used, would involve higher costs and would make the system less compact. In general, the higher costs of the three spatial light modulator assemblies in SSC outweighs the costs of the more powerful lasers.

An advantage of the SSC method is that the image is brighter due to all three lasers being fired at the same time. However, if due to space limitations it is required to use only one SLM, the surface area of the SLM can be divided into three parts, acting in effect as three separate SLMs. The drawback of this is that the quality of each single-colour image is decreased, due to the decrease of SLM surface area available for each monochromatic image. The quality of the polychromatic image is therefore decreased accordingly. The decrease of SLM surface area available means that fewer pixels on the SLM can be used, thus reducing the quality of the image. The quality of the image is reduced because its resolution is reduced. Embodiments utilise the improved SSC technique disclosed in British patent 2,496, 108 which is hereby incorporated in its entirety by reference.

Examples describe illuminating the SLM with visible light but the skilled person will understand that the light sources and SLM may equally be used to direct infrared or ultraviolet light, for example, as disclosed herein. For example, the skilled person will be aware of techniques for converting infrared and ultraviolet light into visible light for the purpose of providing the information to a user. For example, the present disclosure extends to using phosphors and/or quantum dot technology for this purpose.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

The invention claimed is:

1. A method of calculating a hologram having an amplitude and a phase component, the method comprising the ordered steps of:
   (i) receiving an input image comprising a plurality of data values representing amplitude;
   (ii) assigning a random phase value to each data value of the plurality of data values to form a complex data set;
   (iii) performing an inverse Fourier transform of the complex data set;
   (iv) constraining each complex data value of the complex data set to one of a plurality of allowable complex data values, each comprising an amplitude modulation value and a phase modulation value, to form a hologram, wherein for each complex data value of a second complex data set, the step of constraining comprises replacing the amplitude and phase component with the amplitude and phase component of the nearest allowable complex data value in the complex plane,
   the method further comprising:
   defining a line in the complex plane, wherein the line is a spiral towards the origin comprising a first section which is a closed loop around the origin and a second section which extends inwardly from the circumference of the loop towards the origin of the complex plane; and
   defining the plurality of allowable complex data values on the line, wherein the phase modulation values of the plurality of allowable complex data values substantially span at least $2\pi$, and wherein at least one of the allowable complex data values has an amplitude modulation value of zero and a phase modulation value of zero.

2. A method of calculating a hologram as claimed in claim 1 wherein the step of constraining the second complex data set to the plurality of allowable complex data values forms a third data set, the method further comprising:
   (v) performing a forward Fourier transform of the third complex data set, to form a fourth complex data set; and
   (vi) measuring a difference between the amplitude component of the fourth complex data set and the input image.

3. A method of calculating a hologram as claimed in claim 2, wherein if the measured difference is greater than an error, the method further comprises:
   (vii) combining the phase component of the fourth complex data set with the plurality of data values representing amplitude of the input image, or a plurality of data values representing amplitude derived from the input image, to form a fifth complex data set;
   (viii) inverse Fourier transforming the fifth complex data set, to form a sixth complex data set; and
   (ix) constraining each complex data value of the sixth complex data set to one of the plurality of allowable complex data values to form a hologram.

4. A method of calculating a hologram as claimed in claim 3 further comprising repeating the ordered steps (v) to (ix) until the measured difference between the amplitude component of the complex data set that was produced by the previous iteration and the input image is less than the error.

5. A method of calculating a hologram as claimed in claim 1 wherein the first section is circular or elliptical.

6. A method of calculating a hologram as claimed in claim 1 wherein the second section extends to origin.

7. A method of calculating a hologram as claimed in claim 1 wherein the second section extends past the origin.

8. A method of calculating a hologram as claimed in claim 1 wherein the second section is spiral or arc-shaped.

9. A method of calculating a hologram as claimed in claim 1 wherein the length of the second section is less than half the length of the first section.

10. A method of calculating a hologram as claimed in claim 1 wherein the step of defining the plurality of allowable complex data values on the line in the complex plane comprises defining no more than 512 allowable complex data values on the line in the complex plane.

11. A method of calculating a hologram as claimed in claim 1 wherein for each complex data value of the second complex data set, the step of constraining comprises:
    (a) if the amplitude component is less than a threshold, replacing the amplitude component and phase component with zero; and
    (b) if the amplitude component is equal to or greater than the threshold, replacing the amplitude and phase component with the amplitude and phase component of the nearest allowable complex data value in the complex plane.

12. A method of calculating a hologram as claimed in claim 1 wherein for each complex data value of the complex data set, the step of constraining comprises:
    replacing the amplitude and phase component with the amplitude and phase component of the nearest allowable complex data value in the quadrant of the complex plane containing the complex data value.

13. A method of holographic projection, the method comprising:
    calculating a hologram as claimed in claim 1;
    displaying the hologram on light-modulating pixels of at least one display device; and
    illuminating the at least one display device with coherent light and performing a Fourier transform to generate a holographic reconstruction at a replay plane.

14. A method of holographic projection as claimed in claim 13 wherein the light-modulating pixels are provided on one display device and wherein each light-modulating pixel is operable to modulate both amplitude and phase in accordance with a plurality of complex modulation levels, wherein the plurality of complex modulation levels is the plurality of B allowable complex data values.

15. A hologram engine arranged to calculate a hologram as claimed in claim 1.

16. A holographic projector comprising:
    a display device comprising an array of light-modulating pixels, wherein each light-modulating pixel is a cell containing liquid crystal operable to modulate both amplitude and phase;
    a display driver arranged to drive the display device to display a hologram by independently-driving each light-modulating pixel at a respective complex modulation level selected from a plurality of allowable complex modulation levels, each having an amplitude modulation value and phase modulation value; and
    a hologram engine configured to calculate a hologram to be displayed by the display driver, the hologram having an amplitude and a phase component and being calculated by a method comprising the ordered steps of:

(i) receiving an input image comprising a plurality of data values representing amplitude;
(ii) assigning a random phase value to each data value of the plurality of data values to form a complex data set;
(iii) performing an inverse Fourier transform of the complex data set;
(iv) constraining each complex data value of the complex data set to one of a plurality of allowable complex data values, each comprising an amplitude modulation value and a phase modulation value, to form a hologram, wherein for each complex data value of a second complex data set, the step of constraining comprises replacing the amplitude and phase component with the amplitude and phase component of the nearest allowable complex data value in the complex plane,
wherein the plurality of allowable complex modulation levels comprises phase modulation values which span $2\pi$, and wherein at least one of the complex modulation levels has an amplitude modulation value of zero; and
wherein the plurality of allowable complex data values are defined on a line in the complex plane, wherein the line is a spiral towards the origin comprising a first section which is a closed loop around the origin and a second section which extends inwardly from the circumference of the loop towards the origin of the complex plane.

17. The holographic projector of claim 16,
wherein the method further comprises:
defining a line in the complex plane, wherein the line is a spiral towards the origin comprising a first section which is a closed loop around the origin and a second section which extends inwardly from the circumference of the loop towards the origin of the complex plane; and
defining the plurality of allowable complex data values on the line, wherein the phase modulation values of the plurality of allowable complex data values span at least $2\pi$, and wherein at least one of the allowable complex data values has an amplitude modulation value of zero and a phase modulation value of zero.

18. A holographic projector as claimed in claim 16 wherein the display device is a liquid crystal on silicon device.

19. A holographic projector as claimed in claim 18 wherein the liquid crystal is twisted nematic liquid crystal.

* * * * *